US011532160B2

(12) United States Patent
Kawai

(10) Patent No.: US 11,532,160 B2
(45) Date of Patent: Dec. 20, 2022

(54) INFORMATION PROCESSING APPARATUS, CONTROL METHOD, AND PROGRAM

(71) Applicant: NEC CORPORATION, Tokyo (JP)

(72) Inventor: Ryo Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 76 days.

(21) Appl. No.: 16/347,262

(22) PCT Filed: Nov. 7, 2016

(86) PCT No.: PCT/JP2016/082950
§ 371 (c)(1),
(2) Date: May 3, 2019

(87) PCT Pub. No.: WO2018/083793
PCT Pub. Date: May 11, 2018

(65) Prior Publication Data

US 2019/0286913 A1 Sep. 19, 2019

(51) Int. Cl.
*H04N 21/218* (2011.01)
*G06V 20/40* (2022.01)
(Continued)

(52) U.S. Cl.
CPC ................ *G06V 20/47* (2022.01); *G06T 7/20* (2013.01); *G06V 20/52* (2022.01); *H04N 7/18* (2013.01); *H04N 21/21805* (2013.01)

(58) Field of Classification Search
CPC ........... G06K 9/00751; G06K 9/00765; G06K 9/00771; G06K 9/00718; G06T 7/20; H04N 7/18; H04N 21/21805; G08B 25/00
(Continued)

(56) References Cited

U.S. PATENT DOCUMENTS 9,378,632 B2 6/2016 Venetianer et al.
10,181,197 B2 * 1/2019 Hirasawa ......... G08B 13/19608
(Continued)

FOREIGN PATENT DOCUMENTS

JP H06-44470 A 2/1994
JP 2000-308042 A 11/2000
(Continued)

OTHER PUBLICATIONS

International Search Report of PCT/JP2016/082950 dated Jan. 10, 2017 [PCT/ISA/210].

(Continued)

*Primary Examiner* — Helen Shibru
(74) *Attorney, Agent, or Firm* — Sughrue Mion, PLLC

(57) ABSTRACT

An information processing apparatus (2000) includes a summarizing unit (2040) and a display control unit (2060). The summarizing unit (2040) obtains a video (30) generated by each of a plurality of cameras (10). Furthermore, the summarizing unit (2040) performs a summarizing process on the video (30) and generates summary information of the video (30). The display control unit (2060) causes a display system (20) to display the video (30). Here, the display control unit (2060) causes the display system (20) to display the summary information of the video (30) in response to that a change in a display state of the video (30) the display system (20) satisfies a predetermined condition.

19 Claims, 22 Drawing Sheets

(51) Int. Cl.
*G06T 7/20* (2017.01)
*H04N 7/18* (2006.01)
*G06V 20/52* (2022.01)

(58) Field of Classification Search
USPC .......................................................... 386/241
See application file for complete search history.

(56) References Cited

U.S. PATENT DOCUMENTS

| | | | | |
|---|---|---|---|---|
| 10,219,026 | B2 * | 2/2019 | Eim | H04N 5/247 |
| 10,349,013 | B2 * | 7/2019 | Ebihara | G06V 10/56 |
| 10,410,677 | B2 | 9/2019 | Yamaji et al. | |
| 10,645,350 | B2 | 5/2020 | Titus et al. | |
| 10,750,113 | B2 * | 8/2020 | Takahashi | G06V 40/103 |
| 2011/0001824 | A1 | 1/2011 | Chang | |
| 2013/0024807 | A1 * | 1/2013 | Kobayashi | G06F 1/1647<br>715/781 |
| 2014/0146998 | A1 | 5/2014 | Wieser | |
| 2015/0208021 | A1 * | 7/2015 | Cho | G11B 27/327<br>386/230 |
| 2015/0356840 | A1 * | 12/2015 | Wang | G08B 13/19682<br>382/103 |
| 2017/0242554 | A1 * | 8/2017 | Nanjunda Iyer | G06F 16/739 |
| 2017/0358103 | A1 | 12/2017 | Shao et al. | |
| 2018/0285633 | A1 | 10/2018 | Alcock et al. | |

FOREIGN PATENT DOCUMENTS

| | | | |
|---|---|---|---|
| JP | 2001-320699 | A | 11/2001 |
| JP | 2002-157599 | A | 5/2002 |
| JP | 2004-078762 | A | 3/2004 |
| JP | 2006-202062 | A | 8/2006 |
| JP | 2010-166288 | A | 7/2010 |
| JP | 2012-205097 | A | 10/2012 |
| JP | 2014-110582 | A | 6/2014 |
| WO | 2014/021004 | A1 | 2/2014 |

OTHER PUBLICATIONS

Office Action dated Jun. 9, 2020, from the United States Patent and Trademark Office in U.S. Appl. No. 16/674,082.

Japanese Office Action for JP Application No. 2020-122116 dated Aug. 3, 2021 with English Transiation.

Office Action dated Jan. 23, 2020, from the United States Patent and Trademark Office in U.S. Appl. No. 16/674,082.

U.S. Office Action for U.S. Appl. No. 16/674,682 dated Mar. 29, 2022.

U.S. Office Action for U.S. Appl. No. 16/674,082, dated Aug. 3, 2022.

* cited by examiner

| INDENTIFIER | FEATURE | | |
|---|---|---|---|
| | STAYING TIME | MOVING TIME | ... |
| ID001 | ts1 | tm1 | ... |
| ID002 | ts2 | tm2 | ... |
| ID003 | ts3 | tm3 | ... |
| ... | ... | ... | ... |

| CAMERA IDENTIFIER | PRIORITY |
|---|---|
| C001 | 20 |
| C002 | 13 |
| C003 | 7 |
| ... | ... |

INFORMATION PROCESSING APPARATUS, CONTROL METHOD, AND PROGRAM

CROSS REFERENCE TO RELATED APPLICATIONS

This application is a National Stage of International Application No. PCT/JP2016/082950, filed Nov. 7, 2016.

TECHNICAL FIELD

The present invention relates to an information processing apparatus, a control method, and a program.

BACKGROUND ART

A video of a camera is used in various scenes. For example, video surveillance using the video of the camera (so-called a surveillance camera) which images a place to be surveilled is performed.

According to such a background, a technology for easily handling the video of the camera is developed. For example, Patent Document 1 discloses a technology of detecting an important scene from a surveillance video and generating a summary video in which frames other than the important scene are omitted.

RELATED DOCUMENT

Patent Document

[Patent Document 1] Japanese Unexamined Patent Publication No. 2012-205097

SUMMARY OF THE INVENTION

Technical Problem

In the video surveillance or the like, there is a situation in which one person (for example, a surveillant) has to watch a plurality of videos. For example, in a case where a plurality of places to be surveilled are imaged by different surveillance cameras, the surveillant has to view all of videos generated by a plurality of cameras and recognize a place at which an abnormality occurs. This operation requires a lot of workload for the person who watches the video.

The present invention is provided in view of the problem described above. One object of the present invention is related to provide a technology for easily viewing a plurality of videos.

Solution to Problem

An information processing apparatus of the present invention includes: (1) a summarizing unit which obtains videos and generates summary information of the obtained video by performing a summarizing process on the obtained video, each of a plurality of cameras generating the video; and (2) a display control unit which causes a display unit to display the video.

In response to that a change in a display state of the video on the display unit satisfies a predetermined condition, the display control unit causes the display unit to display the summary information of that video.

A control method of the present invention is executed by a computer.

The control method includes: (1) a summarizing step of obtaining videos and generating summary information of the obtained video by performing a summarizing process on the obtained video, each of a plurality of cameras generating the video; and (2) a display control step of causing a display unit to display the video.

In the display control step, in response to that a change in a display state of the video on the display unit satisfies a predetermined condition, the display unit displays the summary information of that video.

A program of the present invention causes a computer to execute each step included in the control method of the invention.

Advantageous Effects of Invention

According to the present invention, there is provided a technology capable of easily viewing a plurality of videos.

BRIEF DESCRIPTION OF THE DRAWINGS

The above objects and other objects, features and advantages will become more apparent from the following description of the preferred embodiments and the accompanying drawings.

FIG. 9 is a diagram illustrating summary information in a table format.

FIG. 20 is a diagram illustrating priority information in a table format.

DESCRIPTION OF EMBODIMENTS

Figure 1:
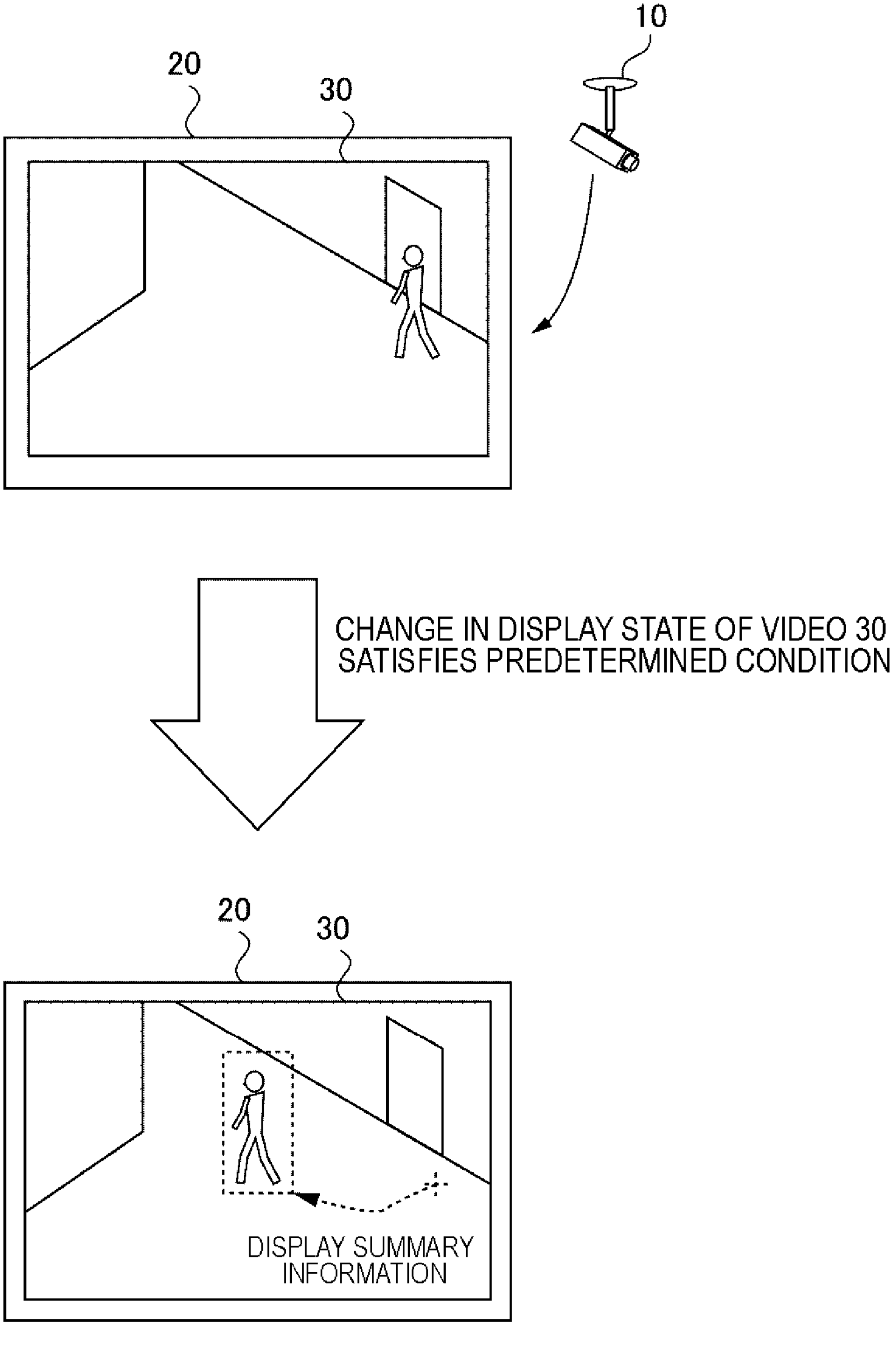
FIG. 1 is a diagram conceptually illustrating an operation of an information processing apparatus according to Example Embodiment 1.

Hereinafter, example embodiments according to the present invention will be described by using the drawings. In all of the drawings, the same components are denoted by the same reference numerals, and description thereof is not repeated as appropriate. In addition, unless otherwise described, in each of block diagrams, each of blocks represents not a hardware unit but a functional unit configuration.

Example Embodiment 1

<Outline of Operation of Information Processing Apparatus 2000>

FIG. 1 is a diagram conceptually illustrating an operation of an information processing apparatus 2000 according to Example Embodiment 1. Note that, FIG. 1 is a diagram for facilitating understanding of the operation of the information processing apparatus 2000, and the operation of the information processing apparatus 2000 is not limited by FIG. 1.

A camera 10 performs imaging and generates still image data or video data. A video 30 is video data based on an imaging result of the camera 10.

The video 30 is displayed on a display system 20. Accordingly, a user of the information processing apparatus 2000 can view the video 30. For example, the information processing apparatus 2000 is an apparatus which provides a surveillance video to a surveillant. In this case, the camera 10 is a surveillance camera which images a place to be surveilled. In addition, in this case, the user of the information processing apparatus 2000 is a surveillant or the like who surveils the surveillance place by viewing the video 30.

The information processing apparatus 2000 generates summary information of the video 30. The summary information of the video 30 indicates any information obtained from contents of the video 30. For example, the summary information indicates a staying time, a trace of movement, and the like of a person captured in the video 30.

The information processing apparatus 2000 causes the display system 20 to display the summary information of the video 30. The summary information in FIG. 1 is an arrow indicating a trace of movement of the person captured in the video 30.

Here, the summary information of the video 30 is displayed in response to that a predetermine condition is satisfied regarding a change in a display state of the video 30 on the display system 20. By watching the summary information of the video 30, the user of the information processing apparatus 2000 can easily recognize contents of the video 30 in the past.

<Outline of Configuration of Information Processing Apparatus 2000>

Figure 2:
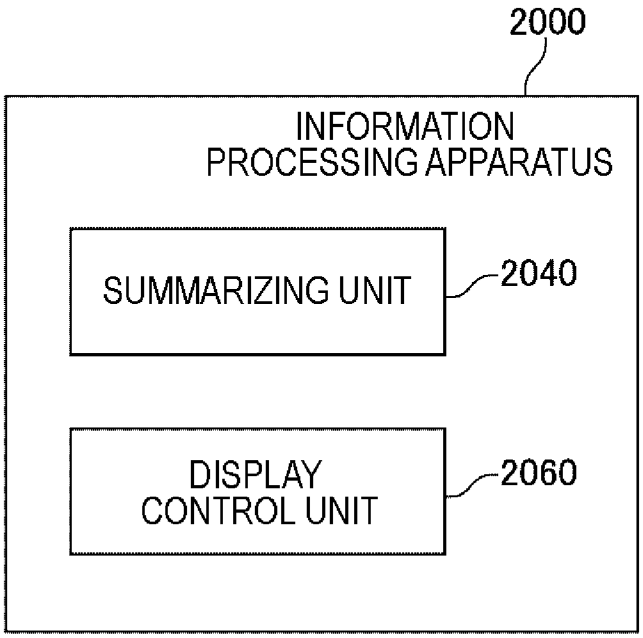
FIG. 2 is a diagram illustrating the information processing apparatus according to Example Embodiment 1 and a use environment of the information processing apparatus.

FIG. 2 is a diagram illustrating the information processing apparatus 2000 according to Example Embodiment 1 and a use environment of the information processing apparatus 2000. The information processing apparatus 2000 includes a summarizing unit 2040 and a display control unit 2060. The summarizing unit 2040 obtains the video 30 generated by each of a plurality of cameras 10. Furthermore, the summarizing unit 2040 performs a summarizing process on the video 30 and generates summary information of the video 30. The display control unit 2060 causes the display system 20 to display the video 30. Here, the display control unit 2060 causes the display system 20 to display the summary information of the video 30 in response to that a predetermine condition is satisfied regarding a change in the display state of the video 30 on the display system 20.

<Advantageous Effect>

In the information processing apparatus 2000 according to the present example embodiment, each of the plurality of cameras 10 generates the video 30. In such a case, a user (for example, a surveillant) of the information processing apparatus 2000 who views the video 30 has to recognize occurrence of an abnormality or the like from a plurality of videos 30. However, a lot of workload is required to recognize contents of the plurality of videos 30. Also, it is apprehended that an important scene in the video 30 may be overlooked.

In the information processing apparatus 2000 according to the present example embodiment, the summary information, in which the contents of the video 30 are summarized, is generated. In addition, the summary information is displayed on the display system 20 in response to that a predetermine condition is satisfied regarding a change in the display state of the video 30 on the display system 20. Here, if the predetermined condition is appropriately determined, it is possible to display the summary information of the video 30 on the display system 20 at the timing that it is appropriate for the user to easily recognize the contents of the video 30. Therefore, according to the information processing apparatus 2000 of the present example embodiment, it becomes easy to view the plurality of videos 30. As a result, it is possible to realize to decrease the workload of the user who wants to view the plurality of videos 30, and to prevent an important scene from being overlooked.

Hereinafter, the present example embodiment will be described in detail.

Hardware Configuration Example of Information Processing Apparatus 2000

Each of function configuration units of the information processing apparatus 2000 may be realized by hardware (for example, hard-wired electronic circuit or the like) which realizes each of the function configuration units or may be realized by a combination (for example, a combination of the electronic circuit and a program controlling the electronic circuit or the like) of hardware and software. Hereinafter, a case where each of the function configuration units in the information processing apparatus 2000 is realized by a combination of hardware and software will be further described.

Figure 3:
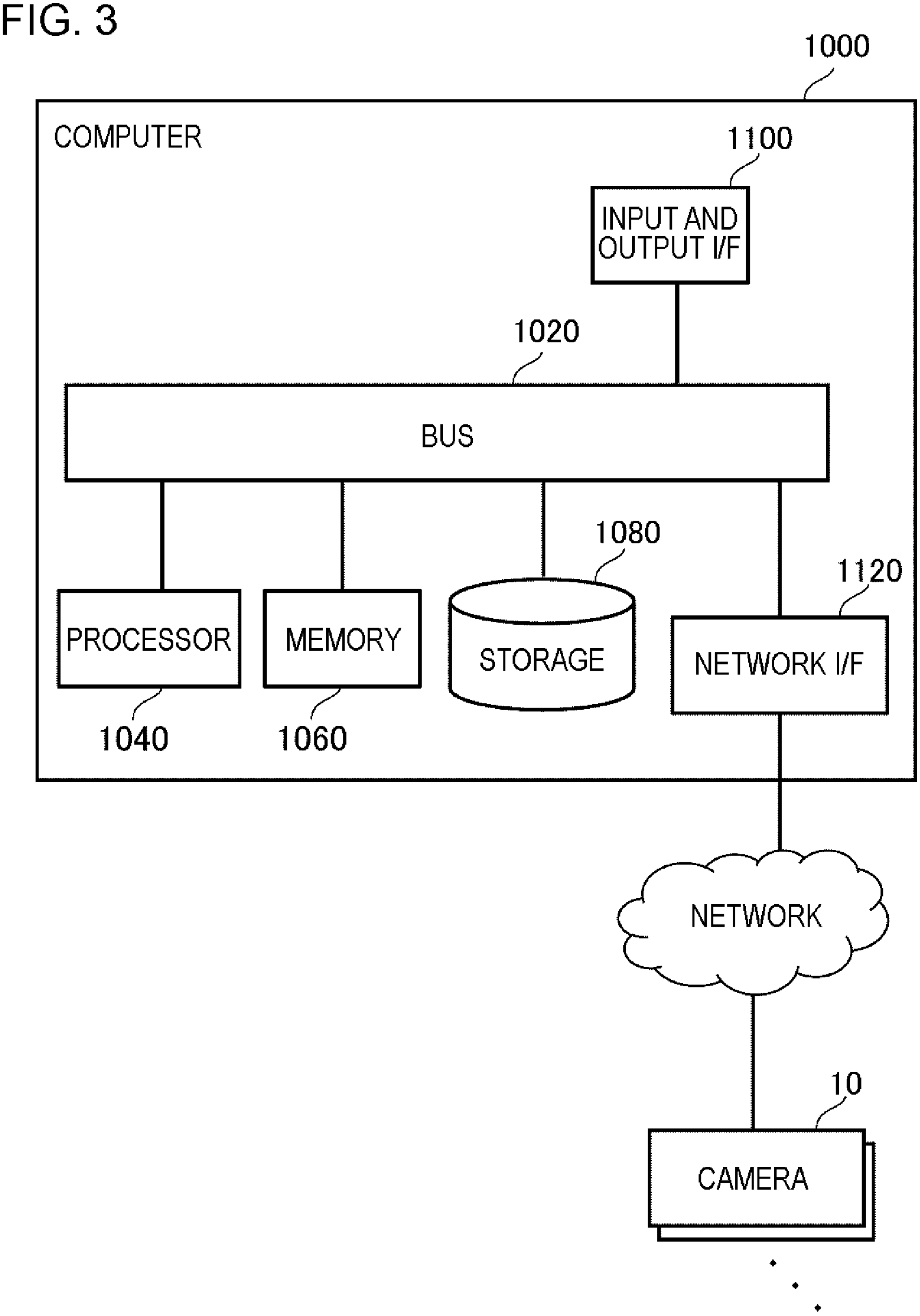
FIG. 3 is a diagram illustrating a computer for realizing the information processing apparatus.

FIG. 3 is a diagram illustrating a computer 1000 for realizing the information processing apparatus 2000. The computer 1000 is a predetermined computer. For example, the computer 1000 is a personal computer (PC), a server machine, a tablet terminal, a smartphone, or the like. The computer 1000 may be a dedicated computer designed to realize the information processing apparatus 2000 or may be a general purpose computer.

The computer 1000 includes a bus 1020, a processor 1040, a memory 1060, a storage 1080, an input and output interface 1100, and a network interface 1120. The bus 1020 is a data transmission line through which the processor 1040, the memory 1060, the storage 1080, the input and output interface 1100, and the network interface 1120 mutually transmit and receive data. However, a method of connecting the processors 1040 and the like to each other is not limited to bus connection. The processor 1040 is an arithmetic apparatus such as a central processing unit (CPU), a graphics processing unit (GPU), or the like. The memory 1060 is a main storage device realized by using a random access memory (RAM) or the like. The storage 1080 is an auxiliary storage device realized by using a hard disk, a solid state drive (SSD), a memory card, a read only memory (ROM), or the like. However, the storage 1080 may be configured with the same hardware as the hardware constituting the main storage device such as a RAM.

The input and output interface 1100 is an interface for connecting the computer 1000 and an input and output device. The network interface 1120 is an interface for connecting the computer 1000 to a communications network. The communications network is, for example, a local area network (LAN) or a wide area network (WAN). A method by which the network interface 1120 connects to the communication network may be a wireless connection or a wired connection.

For example, the computer 1000 is communicably connected to the camera 10 through a network. However, a method of communicably connecting the computer 1000 to the camera 10 is not limited to a connection through the network. In addition, the computer 1000 may not be communicably connected to the camera 10.

The storage 1080 stores a program module which realizes each of the function configuration units (the summarizing unit 2040 and the display control unit 2060) of the information processing apparatus 2000. By reading each of these program modules into the memory 1060 and executing the program module, the processor 1040 realizes a function corresponding to each of the program modules.

Note that, the information processing apparatus 2000 may be realized by using a plurality of computers 1000. For example, the information processing apparatus 2000 can be realized by two computers, that is, the first computer 1000 which realizes a function of the summarizing unit 2040 and the second computer 1000 which realizes a function of the display control unit 2060. In this case, the first computer is a computer which performs a process for generating summary information. On the other hands, the second computer is a computer which performs a process for displaying the summary information to the display system 20. The second computer obtains the summary information from the first computer by a predetermined method.

As described above, for example, the first computer 1000 and the second computer 1000 are realized by a PC, a server machine, a tablet terminal, a smartphone, or the like. However, the first computer 1000 may be realized by the camera 10, in this case, the camera 10 performs the summarizing process on the video 30 generated by the camera 10 and generates summary information. The second computer 1000 obtains the summary information generated by the camera 10. The camera 10 having a function of the summarizing unit 2040 in this manner is, for example, a camera called an intelligent camera, a network camera, an internet protocol (IP) camera, or the like.

Camera 10

The camera 10 is any camera which performs imaging and generates still image data or video data. The video 30 is configured based on the data generated by the camera 10. For example, the video 30 is the video data generated by the camera 10. In another example, the video 30 is configured with a sequence of a plurality of pieces of still image data generated by the camera 10.

The camera 10 may be a camera whose position is fixed (hereinafter, referred to as a fixed camera) or whose position is not fixed (hereinafter, referred to as a moving camera). The fixed camera is a camera installed in various places such as a wall, a pillar, or a ceiling. A place at which the fixed camera is installed may be indoor or outdoor.

Note that, the wall or the like on which the fixed camera is installed is not limited to a real property, and may be fixed for a certain period. For example, the wall or the like on which the fixed camera is installed may be a partition, a pillar, or the like temporally installed at an event hall or the like.

In another example, it is possible to stop a moving object equipped with a camera usable also as a moving camera to be described below at a certain place and to use that camera as a fixed camera. The moving object is, for example, a car, a motorcycle, a robot, a flying object (for example, a drone or an airship), or the like.

The moving camera is, for example, a camera which is put to a person or attached to the moving object or the like described above. The moving camera put to the person is, for example, a camera held by a hand (a camera of a mobile terminal such as a video camera, a smartphone, or the like), a camera fixed to a head, a chest, or the like (wearable camera or the like), or the like. The camera attached to the car, the motorcycle, the robot, the flying object, or the like may be a camera attached for use as a so-called drive recorder, or may be a camera attached separately for generating the video 30 to be provided to the information processing apparatus 2000.

A place imaged by the camera 10 is arbitrary. For example, in a case where the camera 10 is a surveillance camera, the camera 10 images a place to be surveilled. The place to be surveilled is, for example, a route in or around the event hall, a route between the event hall and a nearest station of the event hall, or the like. Note that, the place imaged by the camera 10 may be indoor or outdoor.

<Display System 20>

The display system 20 is configured to include one or a plurality of display devices. Hereinafter, some examples of a display state of the video 30 in the display system 20 will be described. Note that, hereinafter, an example in which the display system 20 is configured to include one display device 22.

Figure 4:
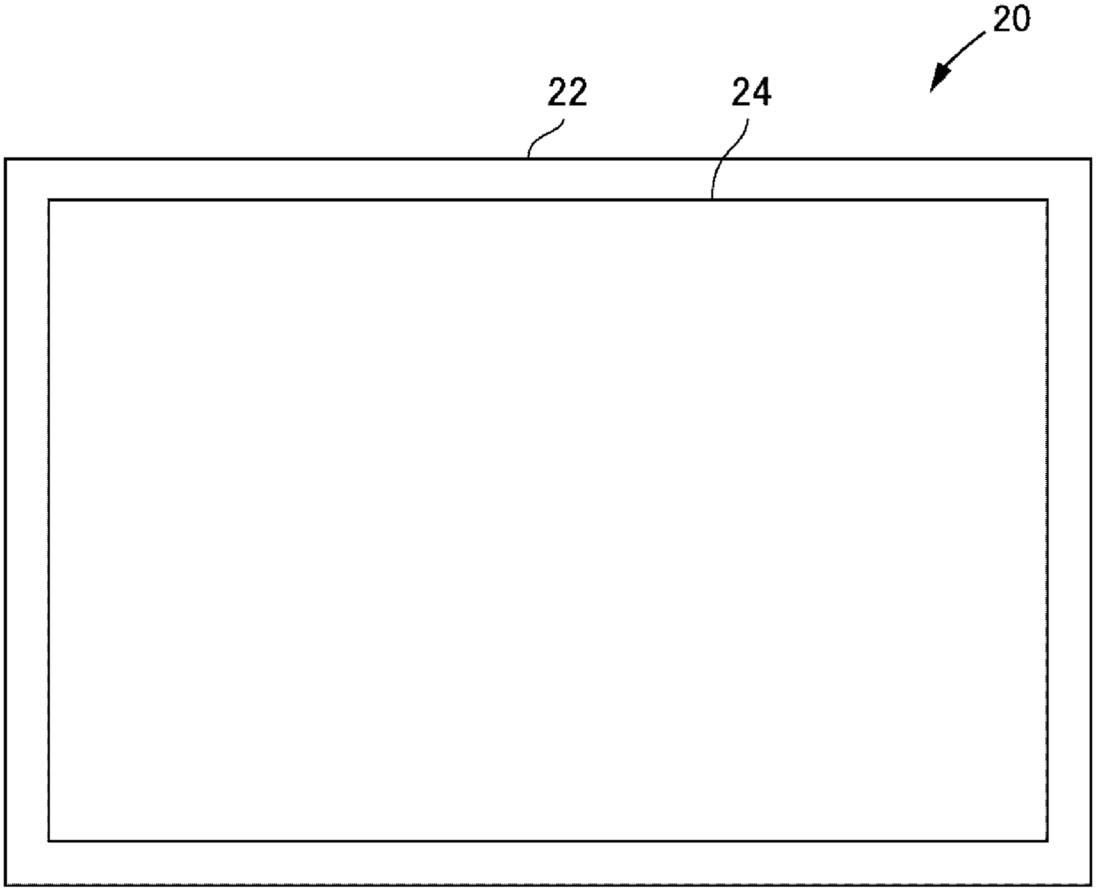
FIG. 4 is the first diagram illustrating a display state of a video in a display system.

FIG. 4 is the first diagram illustrating the display state of the video 30 in the display system 20. The display device 22 in FIG. 4 includes a display area 24 in which the video 30 is displayed. The display control unit 2060 sequentially displays the plurality of videos 30 in the display area 24.

For example, it is assumed that a video 30-1 and a video 30-2 are respectively generated by two cameras 10-1 and camera 10-2. In this case, the video 30 is displayed in the display area 24 in order of the video 30-1, the video 30-2, the video 30-1, the video 30-2, . . . .

Figure 5:
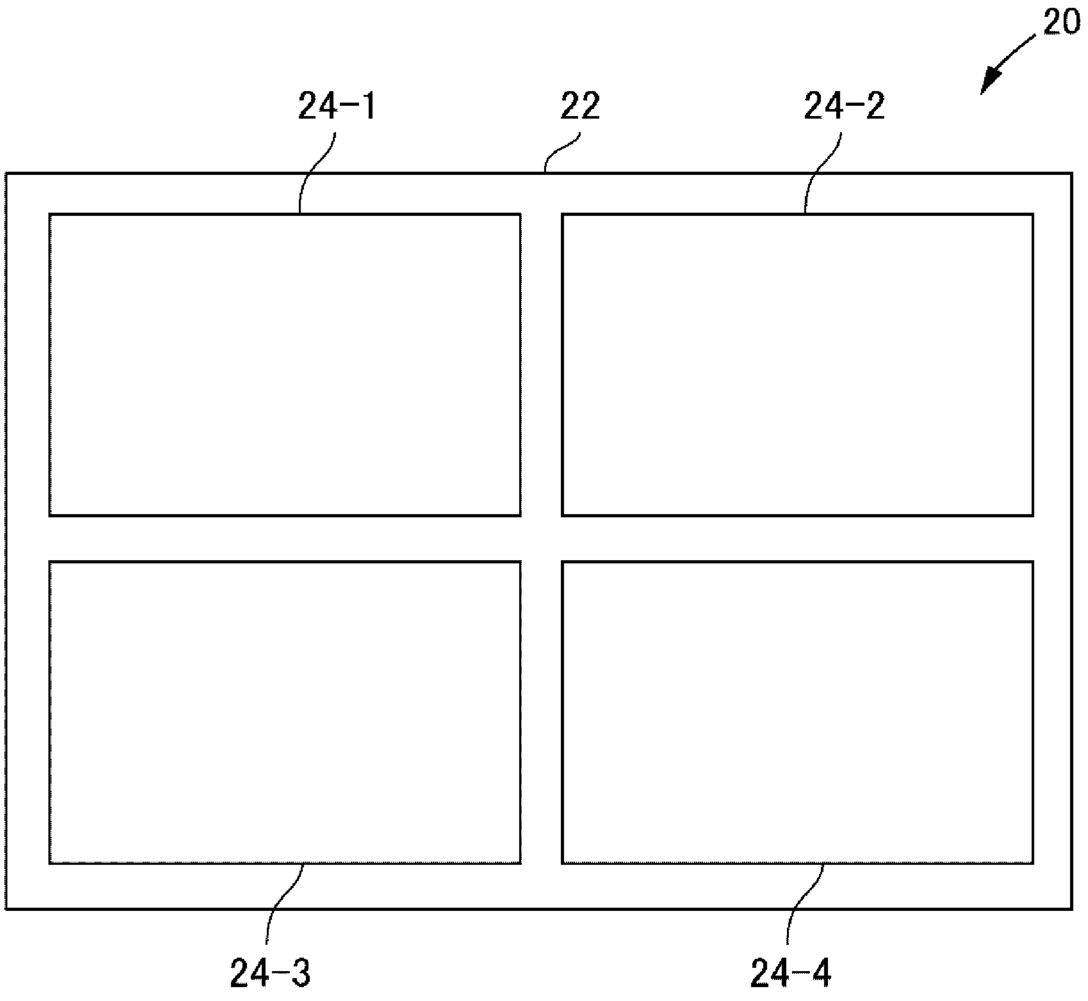
FIG. 5 is the second diagram illustrating the display state of the video in the display system.

FIG. 5 is the second diagram illustrating the display state of the video 30 in the display system 20. The plurality of videos 30 are displayed on the display device 22 at the same time. Specifically, a plurality of display areas 24 having the same size are provided to the display device 22, and each of the different videos 30 is displayed in each of the display areas 24.

In this case, it is assumed that the number of videos 30 (the number of cameras 10) is larger than the number of display areas 24. In this case, in each of the display areas 24, the plurality of videos 30 are sequentially displayed. For example, it is assumed that the number of videos 30 is 8 and the number of display areas 24 is 4. In this case, the display control unit 2060 alternately displays two videos 30 in each of the display areas 24.

Figure 6:
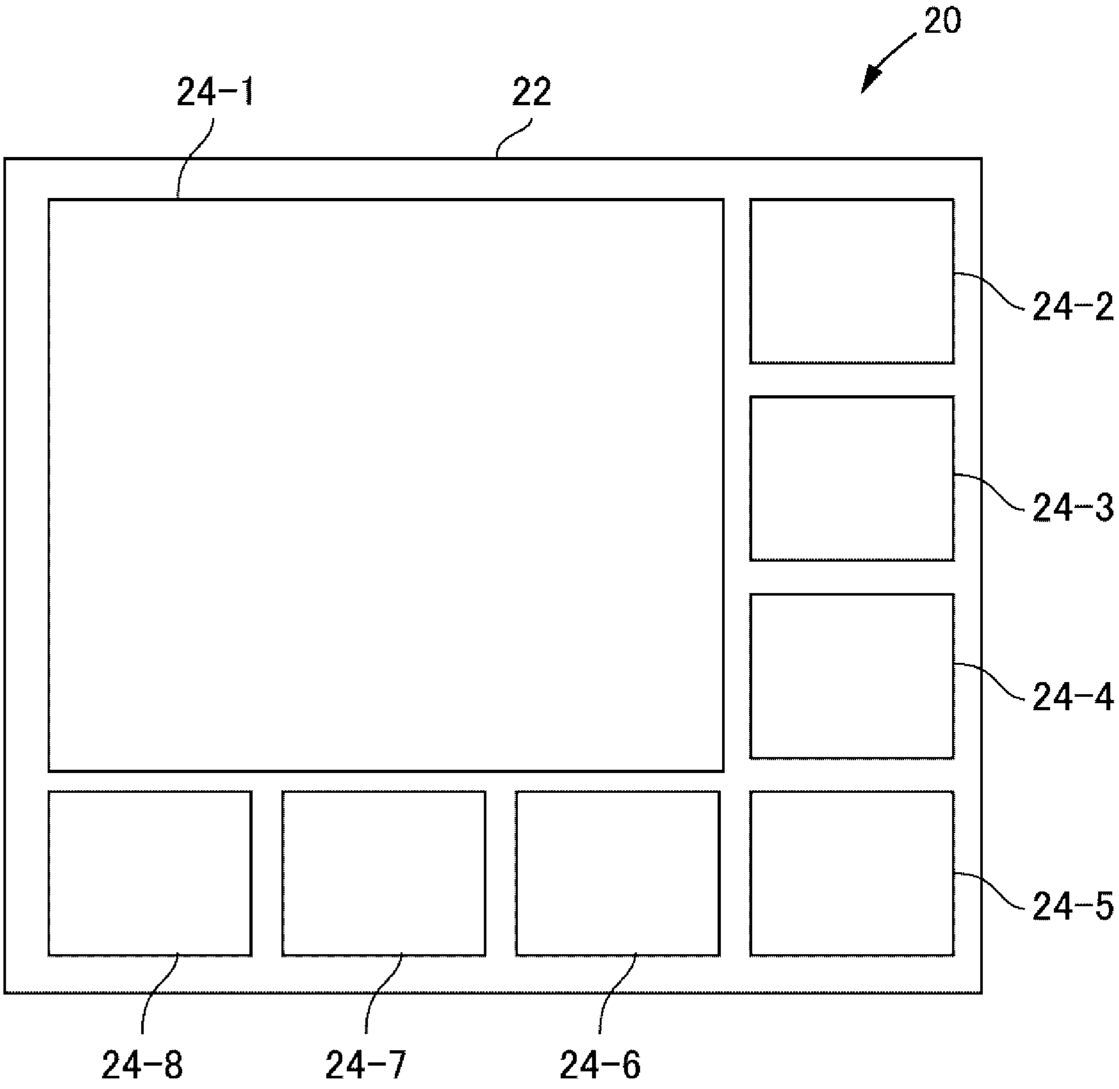
FIG. 6 is a third diagram illustrating the display state of the video in the display system.

FIG. 6 is a third diagram illustrating the display state of the video 30 in the display system 20. The display device 22 in FIG. 6 also includes the plurality of display areas 24. However, in the display device 22 of FIG. 6, there are two types of display areas 24 having different sizes. Sizes of a display area 24-2 to a display area 24-8 are all the same size. On the other hand, the size of a display area 24-1 is larger than the sizes of the other display areas 24.

The different videos 30 are respectively displayed from the display area 24-1 to the display area 24-8. The video 30 displayed in the display area 24-1 is automatically determined, for example, by the display control unit 2060. For example, the display control unit 2060 displays the plurality of videos 30 in the display area 24-1 in turn.

In another example, the video 30 displayed in the display area 24-1 may be selected by the user of the information processing apparatus 2000. For example, it is assumed that the display device 22 includes a touch panel. In this case, the user performs an operation of touching any one of the display area 24-2 to the display area 24-8. According to this operation, the display control unit 2060 changes a display position of the video 30 displayed in the touched display area 24 to the display area 24-1.

Figure 7:
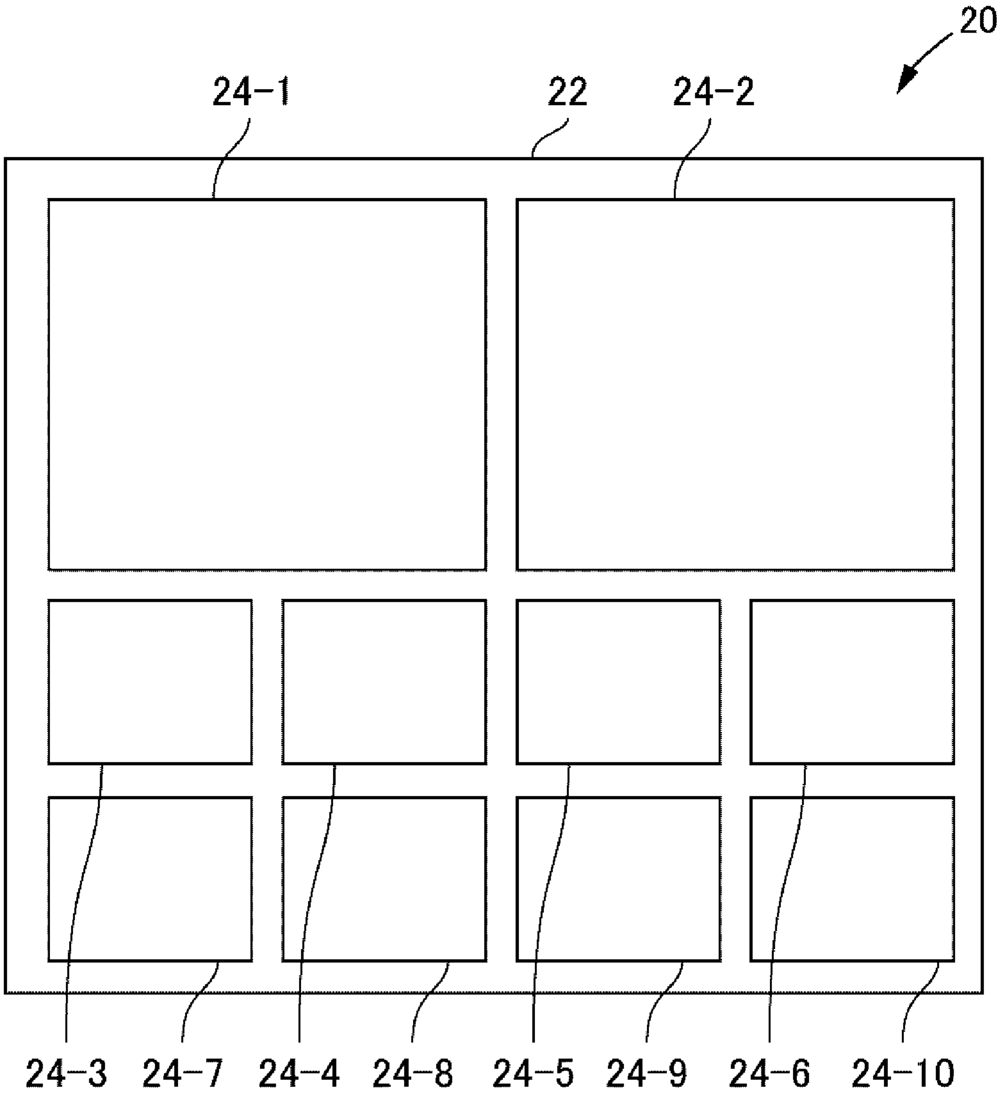
FIG. 7 is a fourth diagram illustrating the display state of the video in the display system.

FIG. 7 is a fourth diagram illustrating the display state of the video 30 in the display system 20. FIG. 7 is the same as FIG. 6 except that FIG. 7 includes the plurality of display areas 24 having large size.

As described above, here, the display system 20 may be configured with a plurality of display devices 22. For example, in this case, each of the plurality of display areas 24 in the example described above is realized by one display device 22. In this case, the display control unit 2060 handles each of the display devices 22 in the same manner as the display area 24 in the example described above.

<Flow of Process>

Figure 8:
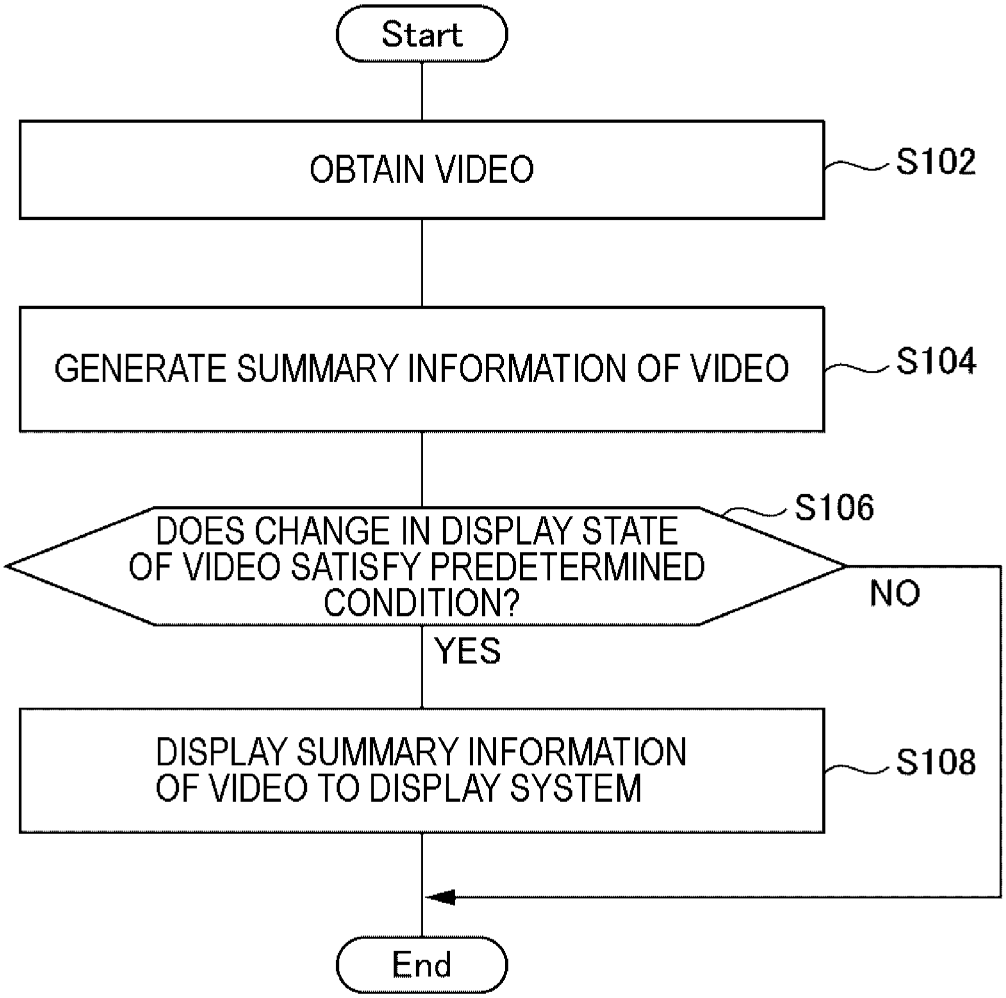
FIG. 8 is a flowchart illustrating a flow of a process executed by the information processing apparatus according to Example Embodiment 1.

FIG. 8 is a flowchart illustrating a flow of a process executed by the information processing apparatus 2000 according to Example Embodiment 1. The summarizing unit 2040 obtains the video 30 from each of the cameras 10 (S102). The summarizing unit 2040 generates summary information of the video 30 (S104). In a case where a change in the display state of the video 30 satisfies a predetermined condition (YES in S106), the display control unit 2060 causes the display system 20 to display the summary information of the video 30 (S108).

Note that, as described below, timing when a process (S102 and S104) for generating the summary information is executed and timing when a process (S106 and S108) for displaying the summary information to the display system 20 is executed are various. Thus, these processes do not have to be executed sequentially as illustrated in FIG. 8. The timing when generating the summary information and the timing when displaying the summary information will be specifically described below.

<Method of Obtaining Video 30: S102>

The summarizing unit 2040 obtains the video 30 (S102). A method by which the summarizing unit 2040 obtains the video 30 is arbitrary. For example, the summarizing unit 2040 receives the video 30 transmitted from the camera 10. In another example, the summarizing unit 2040 accesses the camera 10 and obtains the video 30 stored in the camera 10.

Note that, the camera 10 may store the video 30 in a storage device provided outside the camera 10. In this case, the summarizing unit 2040 accesses the storage device and obtains the video 30. Note that, each of the videos 30 generated by the plurality of cameras 10 may be stored in the same storage device or may be respectively stored in different storage devices.

In a case where the camera 10 has a function of the summarizing unit 2040 (a case where the first computer 1000 is realized by the camera 10), the summarizing unit 2040 obtains the video 30 stored in a storage device (for example, the memory 1060 or the storage device 1080 in FIG. 3) inside the camera 10.

<Contents of Summary Information: S104>

The summarizing unit 2040 performs the summarizing process on the video 30 and generates summary information of the video 30 (S104). Here, contents of the summary information generated by the summarizing unit 2040 will be described. As described above, the summary information indicates any information obtained from contents of the video 30. However, it is preferable for the user that viewing the summary information of the video 30 enables to recognize the contents of the video 30 more easily than viewing the video 30 itself. In other words, it is preferable that the contents of the summary information are those that briefly represent important contents for the user among the contents of the video 30.

The content important for the user is, for example, a feature of an object captured in the video 30. Hereinafter, in a case where the summary information indicates a feature of a certain object, the object is referred to as "target object".

As the target object, various objects can be handled. For example, the target object is a person. In another example, the target object is any moving object described above. In another example, the target object may be luggage (a package such as a bag or the like) carried by a person, a moving object, or the like.

The feature of the target object is, for example, a staving time, a moving time, a moving velocity, a moving state, or the like. The staying time represents a length of a period when the target object stays in the video 30. The staying here means that the target object stops or hardly moves (for example, a size of a moving range is equal to or less than a predetermined value). The moving time represents a length of a period when the target object moves in the video 30. The moving here means that the target object does not stay (for example, the size of the moving range is larger than the predetermined value). The moving velocity represents a moving velocity (for example, an average velocity) of the target object during a period when the target object moves. The moving state represents, for example, a trace of movement (such as whether the target object moves straight or meanderingly).

Here, in a case where the target object repeatedly moves and stays, the staying time indicated in the summary information may be each of a plurality of staying times, or a statistical value of the plurality of staving times (total value, mode, average value, or the like) may be used. The same applies to the moving time, the moving velocity, and the moving state.

By using the summary information indicating the feature of staying or movement of the target object, for example, it is possible to determine a target object to be focused and to intensively surveil the target object. For example, in a case where a person stays for a long time in a place at which a person normally does not stop, it is conceivable that the person is a person to be focused. In addition, in a case where a bag or the like is left in a place at which luggage is not normally left, it can be said that that luggage is suspicious and to be focused.

Note that, the feature of the target object is not limited to the example described above. Another example of the feature of the target object will be described below.

The summarizing unit 2040 detects a target object from the video 30 and computes a feature of the target object. For example, the summarizing unit 2040 computes a change in a position of the target object by detecting the target object from each of frames constituting the video 30. The summarizing unit 2040 computes the staying time, the moving time, the moving velocity, the moving state, and the like from the change in the position of the target object. Note that, in a case of detecting a plurality of different target objects from the video 30, the summarizing unit 2040 computes a feature for each of the target objects.

Here, in a case where the target object is a person, the summarizing unit 2040 may compute values of various attributes (hereinafter, referred to as attribute values) for the target object and include these attribute values in the features of the target object. An attribute of the person is, for example, an age group, a gender, a nationality, the presence or absence of belongings, whether or not the person is a person with difficulty in walking, or the like. Here, the person with difficulty in walking means a person who walks with assistance from an animal or another person, or a person Who walks using an assistance tool. The animal supporting the person with difficulty in walking is a guide dog, for example. The assistance tool used by the person with difficulty in walking is, for example, a crutch or a wheelchair.

The attribute values of the age group are various values representing the age group. For example, an age group (10s or 20s) or a category (a child, a young person, an elderly, or the like) representing an age is exemplified. The attribute value of the gender is male or female.

The attribute value of the nationality is a value representing a birth country or a living country, or a feature based on the country. For example, the attribute value of the nationality indicates either Japanese or a foreigner. In another example, the attribute value of the nationality indicates a category of countries such as Asia, Europe, or Africa. In another example, the attribute value of the nationality may indicate a language to be used (Japanese, English, Chinese, or the like).

The attribute value of the presence or absence of belongings indicates, regarding various types of belongings, whether or not such the belongings are belonged or used. For example, a walking stick, a wheelchair, a baby carriage, and the like correspond to the belongings. For example, the attribute value of the presence or absence of the walking stick represents whether or not the walking stick is belonged or is used.

The attribute value as to whether or not a person is a person with difficulty in walking represents whether the person is supported by an animal or another person, whether or not the person uses the assistance tool, or the like. For example, whether or not a certain person is a person with difficulty in walking can be determined based on the presence or absence of an animal or another person who supports the person. For example, in a case where the summarizing unit 2040 detects a scene in which a person A is supported by another person B from the video 30, the summarizing unit 2040 determines that the person A is a person with difficulty in walking. In addition, in a case where the summarizing unit 2040 detects a scene in which a person moves together with an animal having a predetermined feature such as a guide dog from the video 30, the summarizing unit 2040 determines that the person is a person with difficulty in walking.

In another example, whether or not a person is a person with difficulty in walking can be determined based on the presence or absence of use of the assistance tool. For example, in a case of detecting a person using a predetermined tool such as a crutch or a wheelchair from the video 30, the summarizing unit 2040 determines that the person is a person with difficulty in walking.

By using the summary information indicating the attribute of such a person, for example, it is possible to determine a person who may need assistance, such as an elderly, a foreigner, a missing child, a person with difficulty in walking and to focus on and surveil the person. In addition, in order to handle such a person, it is possible to take measures such as having staff go to a place at which the person is located.

Figure 9:
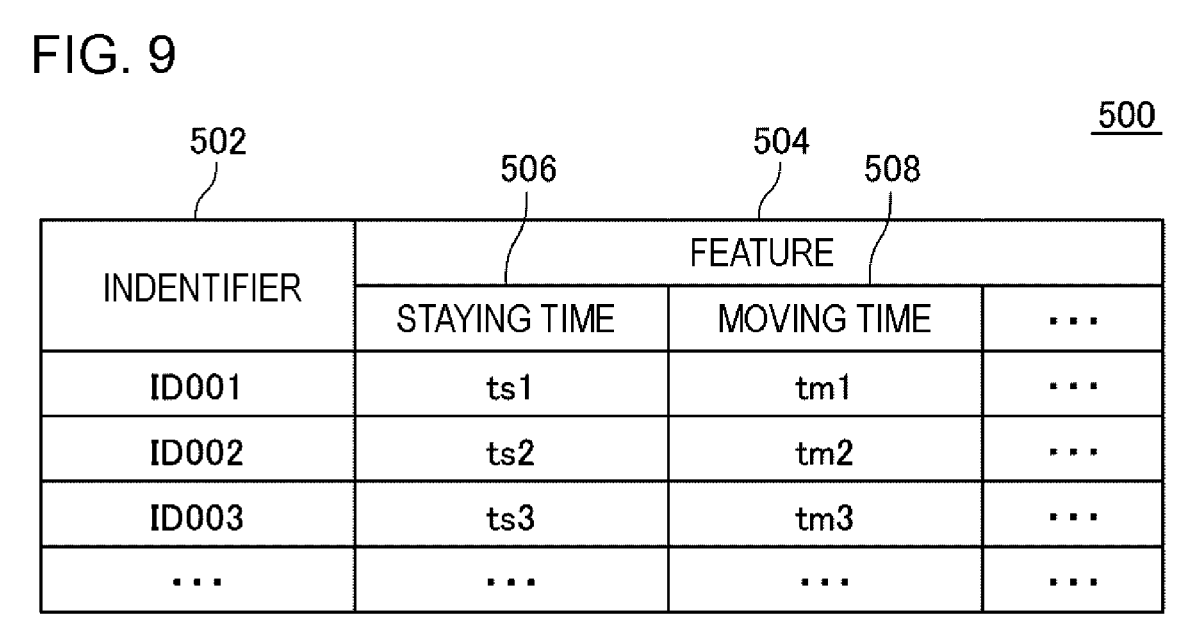

FIG. 9 is a diagram illustrating the summary information in a table format. The table in FIG. 9 is referred to as a table 500. The table 500 has fields of an identifier 502 and a feature 504. The identifier 502 is an identifier of the target object. The feature 504 indicates a feature of the target object determined by the identifier 502. In FIG. 9, the feature 504 includes a staying time 506, a moving time 508, or the like.

<Timing of Displaying Summary Information: S106>

The display control unit 2060 detects that a change in the display state of a certain video 30 in the display system 20 satisfies a predetermined condition (S106). As this predetermined condition, various conditions can be adopted. Hereinafter, some examples of the predetermined condition will be described. In the following description, the video 30-1 is the video 30 generated by the camera 10-1, Example 1 of Predetermined Condition The predetermined condition is, for example, a condition that "the video 30 is switched from a state in which the video 30 is not displayed to the display system 20 to a state in which the video 30 is displayed to the display system 20."

Figure 10:
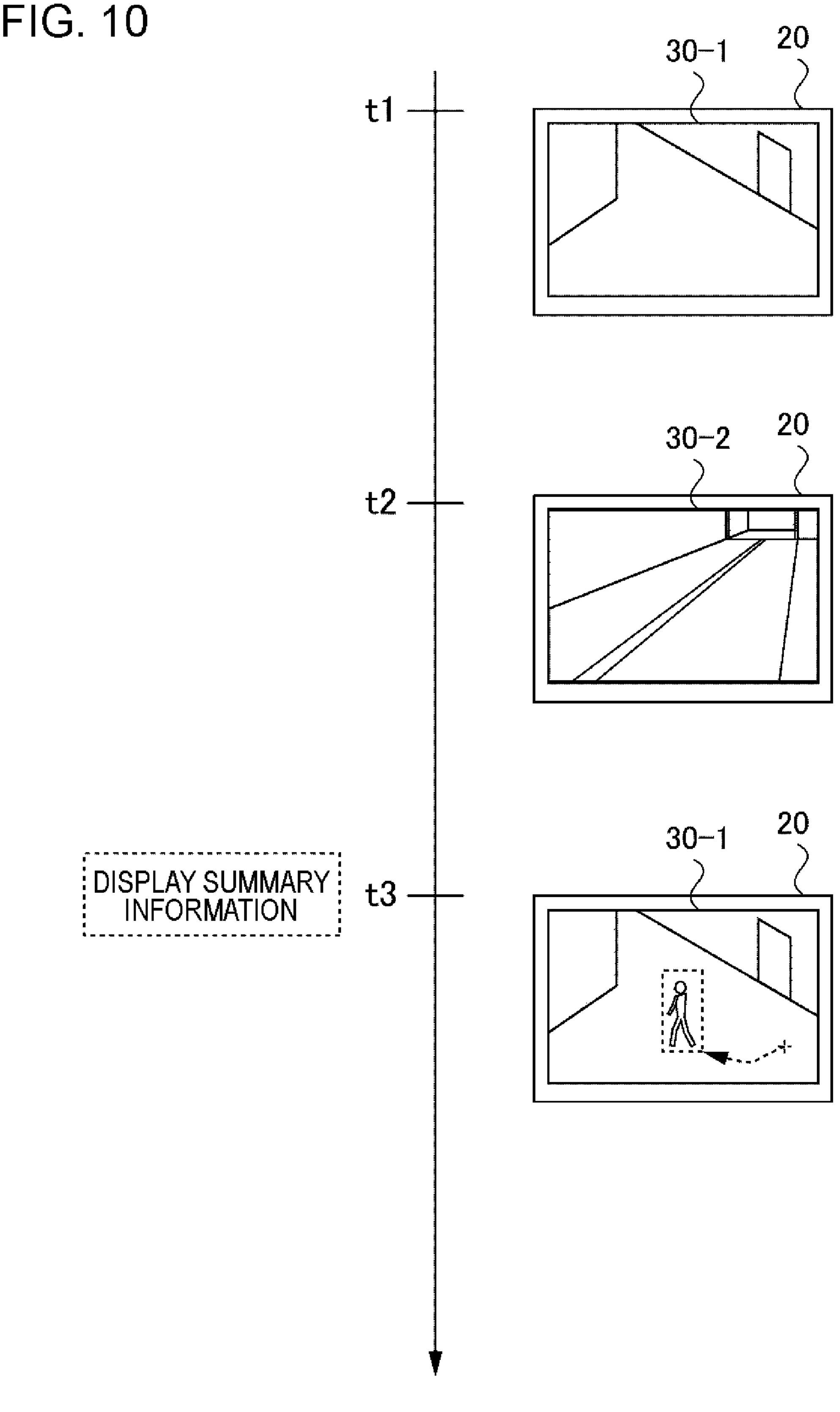
FIG. 10 is the first diagram illustrating timing when displaying summary information of a video based on the first example of a predetermined condition.

FIG. 10 is the first diagram illustrating timing when displaying the summary information of the video 30 based on the first example of the predetermined condition. The video 30-1 is displayed to the display system 20 between time t1 to time t2. On the other hand, the video 30-1 is not displayed to the display system 20 between the time t2 to time t3. After the time t3, the video 30-1 is displayed to the display system 20 again.

The display control unit 2060 causes the display system 20 to display the summary information of the video 30-1 at timing when the predetermined condition is satisfied, that is, at the time t3.

Here, the summary information to be displayed to the display system 20 by the display control unit 2060 preferably includes summary information generated during a period between the first time at which the display state of the video 30 is switched from the first display state into the second display state and the second time at which the display state of the video 30 is switched from the second display state into the first display state. For example, in the example in FIG. 10, the first time is the time when a state in which the video 30 is displayed to the display system 20 is switched into a state in which the video 30 is not displayed to the display system 20: that is, at the time t2. On the other hand, the second time is the time when a state in which the video 30 is not displayed to the display system 20 is switched into a state in which the video 30 is displayed to the display system 20: that is, at the time t3. That is, summary information generated during a period between the time t2 and the time t3 is displayed to the display system 20.

By displaying the summary information of such a period to the display system 20, summary information of the video 30 during a period when the video 30-1 is not displayed to the display system 20, i.e. a period when the user cannot view the video 30-1, is displayed to the display system 20. By watching the summary information at the time t3, the user can easily recognize what is happened in an imaging range of the camera 10-1 during the period when the video 30-1 cannot be viewed.

Example 2 of Predetermined Condition

The predetermined condition is, for example, a condition that "in the display system 20, a state in which the video 30 is displayed in a relatively small size is switched into a state in which the video 30 is displayed in a relatively large size."

Figure 11:
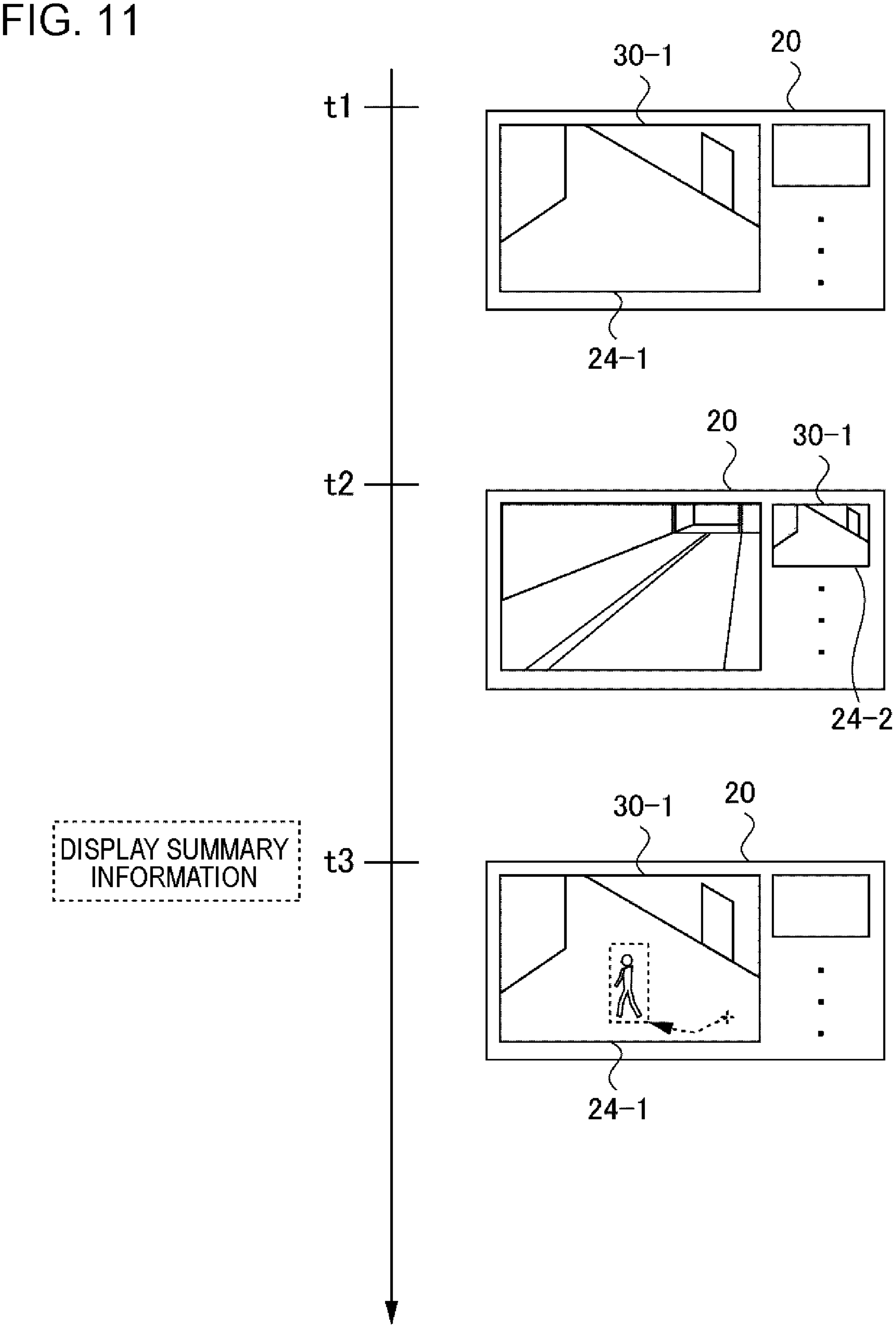
FIG. 11 is a diagram illustrating a scene in which the summary information of the video is displayed based on the second example of the predetermined condition.

FIG. 11 is a diagram illustrating a scene in which the summary information of the video 30 is displayed based on the second example of the predetermined condition. The video 30-1 is displayed in the display area 24-1 of the display system 20 between the time t1 to the time t2. On the other hand, the video 30-1 is displayed in the display area 24-2 of the display system 20 between the time t2 to the time t3. After the time t3, the video 30-1 is displayed in the display area 24-1 again.

Here, the size of the display area 24-1 is larger than the size of the display area 24-2. Therefore, the video 30-1 is displayed to the display system 20 in a relatively small size between the time t2 to the time t3.

The display control unit 2060 causes the display system 20 to display the summary information of the video 30-1 at timing when the predetermined condition is satisfied: that is, at the time t3.

In this case, for example, the display control unit 2060 causes the display system 20 to display summary information generated for the video 30 during a period between the time t2 and the time t3. The time t2 is the time when a condition that "in the display system 20, a state in which the video 30 is displayed in a relatively large size is switched into a state in which the video 30 is displayed in a relatively small size" is satisfied. Since the period between the time t2 and the time t3 is a period when the video 30-1 is displayed in a small size to the display system 20, the period is a period when it is not easy for the user to view the video 30-1. Therefore, by watching the summary information regarding the video 30 during that period at the time t3, the user can easily recognize what is happened in the imaging range of the camera 10-1 during the period when it is not easy to view the video 30-1.

Example 3 of Predetermined Condition

The predetermined condition is, for example, a condition that "in the display system 20, a state in which the video 30 is displayed at a position being less likely to come into sight of the user is switched into a state in which the video 30 is displayed at a position being more likely to come into sight of the user".

Figure 12:
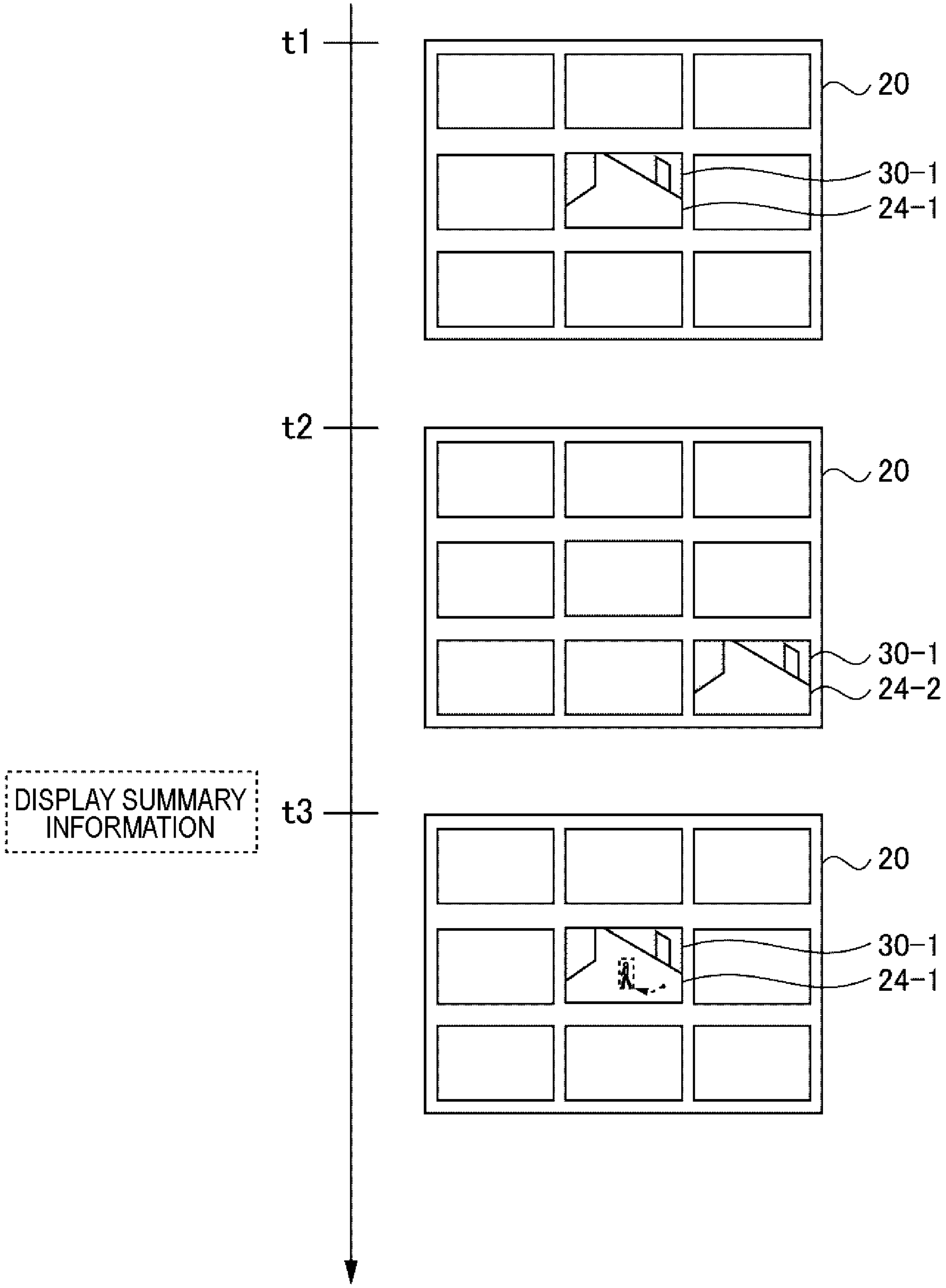
FIG. 12 is a diagram illustrating a scene in which the summary information of the video is displayed based on a third example of the predetermined condition.

FIG. 12 is a diagram illustrating a scene in which the summary information of the video 30 is displayed based on the third example of the predetermined condition. The video 30-1 is displayed in the display area 24-1 of the display system 20 between the time t1 to the time t2. On the other hand, the video 30-1 is displayed in the display area 24-2 of the display system 20 between the time t2 to the time t3. After the time t3, the video 30-1 is displayed in the display area 24-1 again.

Here, it is assumed that the display area 24-1 is at a position at which a front direction of the user crosses the display system 20. Therefore, the display area 24-2 is far from the position at which the front direction of the user of the information processing apparatus 2000 crosses the display system 20, as compared with the display area 24-1. Thus, it can be said that it is more difficult for the user to view the video 30-1 during the period between the time t2 to the time t3 than other periods.

The display control unit 2060 causes the display system 20 to display the summary information of the video 30-1 at the timing when the predetermined condition is satisfied: that is, at the time t3.

In this case, for example, the display control unit 2060 causes the display system 20 to display summary information generated for the video 30 during a period between the time t2 and the time t3. The time t2 is the time when a condition that "in the display system 20, a state in which the video 30 is displayed at a position being less likely to come into sight of the user is switched into a state in which the video 30 is displayed at a position being more likely to come into sight of the user". By generating the summary information in this manner, the user who watches the summary information can easily recognize what is happened in the imaging range of the camera 10-1 during the period when it is difficult to view the video 30-1.

Here, "front direction of the user" described above may be, for example, a front direction of the user's face, a front direction of the user's body, or a gaze direction of the user. Here, in a case where a position of the user is fixed (for example, a case where a position of a chair on which the user sits is fixed), a relationship between each of the display areas 24 and a position at which the front direction of the user crosses the display system 20 is can be predetermined.

In another example, the summarizing unit 2040 may determine the front direction of the user by analyzing an image generated by a camera which images the user. In this manner, the summarizing unit 2040 can compute the relationship between each of the display areas 24 and the position at which the front direction of the user crosses the display system 20. Note that, the camera which images the user is provided in the vicinity of the display system 20, for example, Here, as a specific method of determining the front direction or the like of the user's face described above, an existing method can be used.

In addition, the degree of how likely it comes into sight of the user may be associated with each of the display areas 24 in advance. The association information is stored in advance in a storage device accessible from the display control unit 2060.

Other Example

Timing when the summary information is displayed to the display system 20 may not be limited to the tuning when the display state of the video 30 satisfies the predetermined condition. For example, the information processing apparatus 2000 may display the summary information of the video 30 to the display system 20 in response to receiving an input from the user to select the video 30 displayed to the display system 20.

<Display State of Summary Information: S108>

As a change in the display state of the video 30 satisfies the predetermined condition, the display control unit 2060 causes the display system 20 to display the summary information of the video 30 (S108). As the display state of the summary information, various states can be adopted. Hereinafter, an example of the specific display state of the summary information will be described. Note that, in each of the following examples, the summary information is generated for the video 30-1 generated by the camera 10-1.

Figure 13:
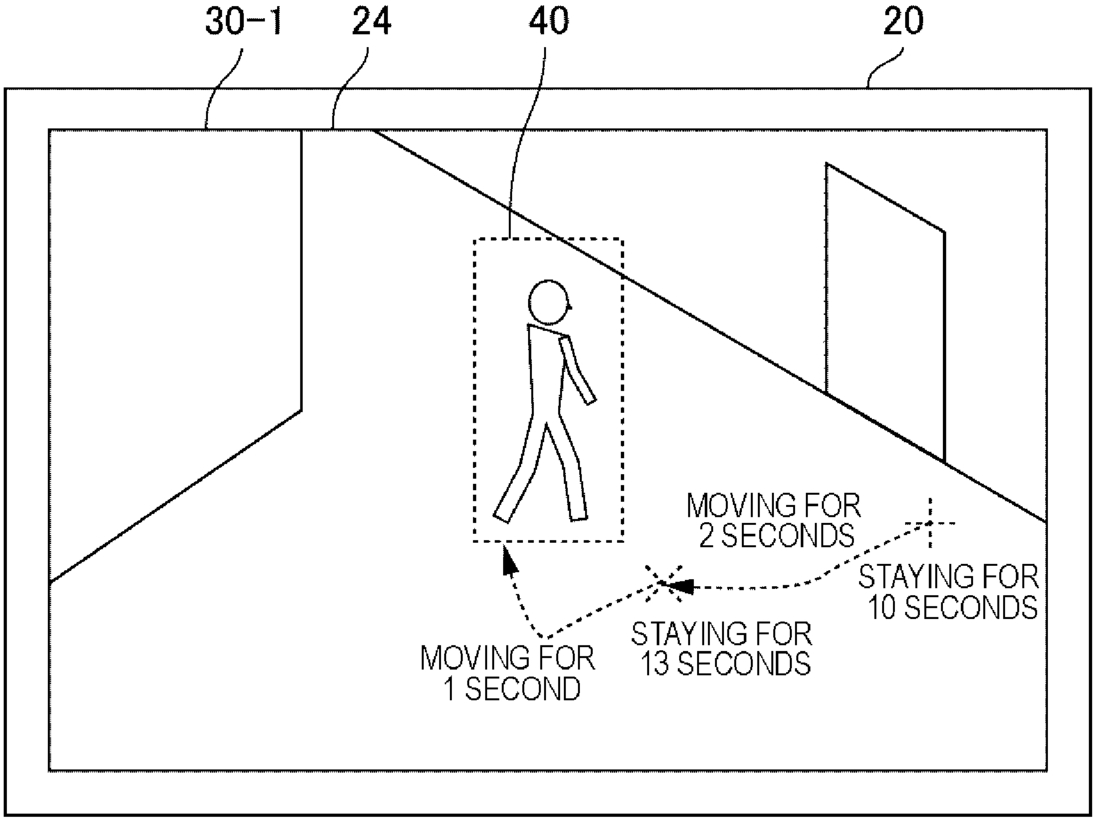
FIG. 13 is the first diagram illustrating a display state of the summary information.

FIG. 13 is the first diagram illustrating the display state of the summary information. In this example, the video 30-1 generated in real time by the camera 10-1 (so-called live video) is displayed in the display area 24 of the display system 20. The summary information of the video 30-1 is also displayed in the display area 24.

More specifically, the summary information of the video 30-1 is superimposed and displayed on the live video generated by the camera 10-1. The summary information of FIG. 13 represents that a target object 40 captured in the video 30-1 acts in order of (1) staying for 10 seconds, (2) moving for 2 seconds. (3) staying for 13 seconds, and (4) moving for 1 second. In addition, an arrow represents a trace of movement of the target object 40.

Figure 14:
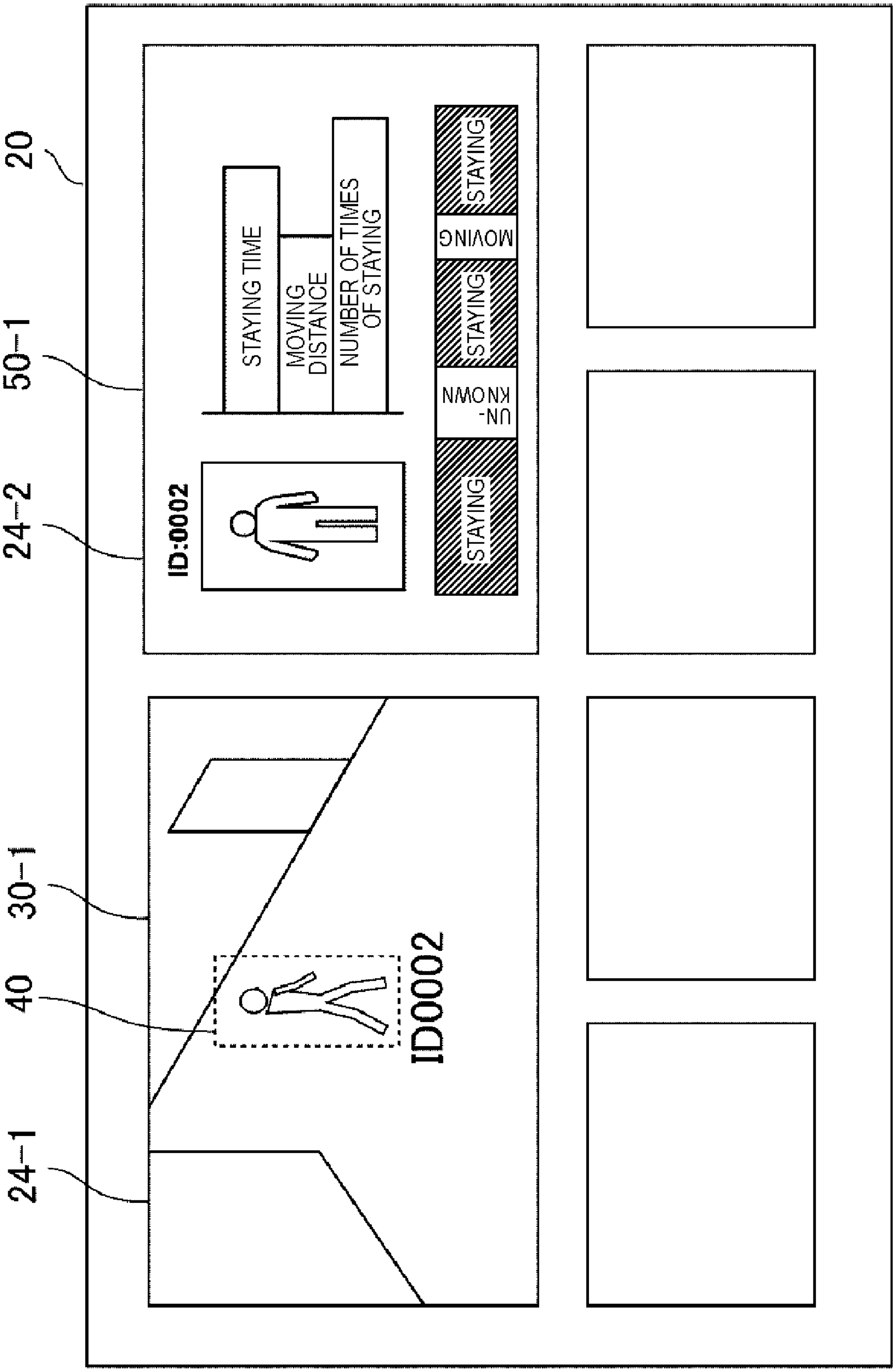
FIG. 14 is the second diagram illustrating the display state of the summary information.

Note that, in a case where a plurality of target objects 40 are included in the video 30-1, the summary information is displayed for each of the target objects 40, FIG. 14 is the second diagram illustrating the display state of the summary information. In this example, the live video generated by the camera 10-1 is displayed in the display area 24-1. In addition, summary information 50-1 of the video 30-1 is displayed in the display area 24-2 instead of the display area 24-1. That is, in this example, the display area 24 in which the summary information of the video 30-1 is displayed is different from the display area 24 in which the video 30-1 is displayed.

Here, it is assumed that summary information on each of a plurality of target objects 40 is generated for the video 30-1. In this case, a plurality of pieces of summary information may be displayed in one display area 24 (the display area 24-2 in FIG. 14) or may be displayed in different display areas 24. Note that, in the former case, the plurality of pieces of summary information may be displayed at the same time or may be displayed in order.

Note that, the summary information of the video 30-1 may be displayed to the display system 20 at timing when the video 30-1 is not displayed to the display system 20. For example, the display control unit 2060 displays the summary information of the video 30-1 in the display area 24-1 of the display device 22 during a predetermined period from the timing when the predetermined condition described above for the video 30-1 is satisfied. Meanwhile, the display control unit 2060 does not display the video 30 to the display system 20. After the predetermined period elapses, the display control unit 2060 displays the video 30 in the display area 24-1.

Note that, in each of the examples described above, the summary information is represented by still data such as a character and a figure. However, the summary information may be generated as video data. In this case, for example, the summary information of the video 30 is generated by omitting some of frames of the video 30. For example, regarding a period when the target object stops, the summarizing unit 2040 omits one or more frames other than the frame in which the target object starts stopping and the frame in which the target object ends stopping. In another example, regarding frames during a period when the target object moves, the summarizing unit 2040 omits one or more frames other than the frame in which the target object starts moving and the frame in which the target object ends moving.

Note that, when omitting some of the frames of the video 30, it is preferable not to omit a frame including characteristic movement of the target object. For example, in a case where the target object is a person, it is preferable not to omit frames during a period when the person is contact with another person or the person takes a look around.

<Timing of Generating Summary Information: S104>

The summarizing unit 2040 generates summary information of the video 30 (S104). Timing when the summarizing unit 2040 generates the summary information is various. Hereinafter, some examples of the timing will be described.

Timing 1 of Generating Summary Information

Figure 15:
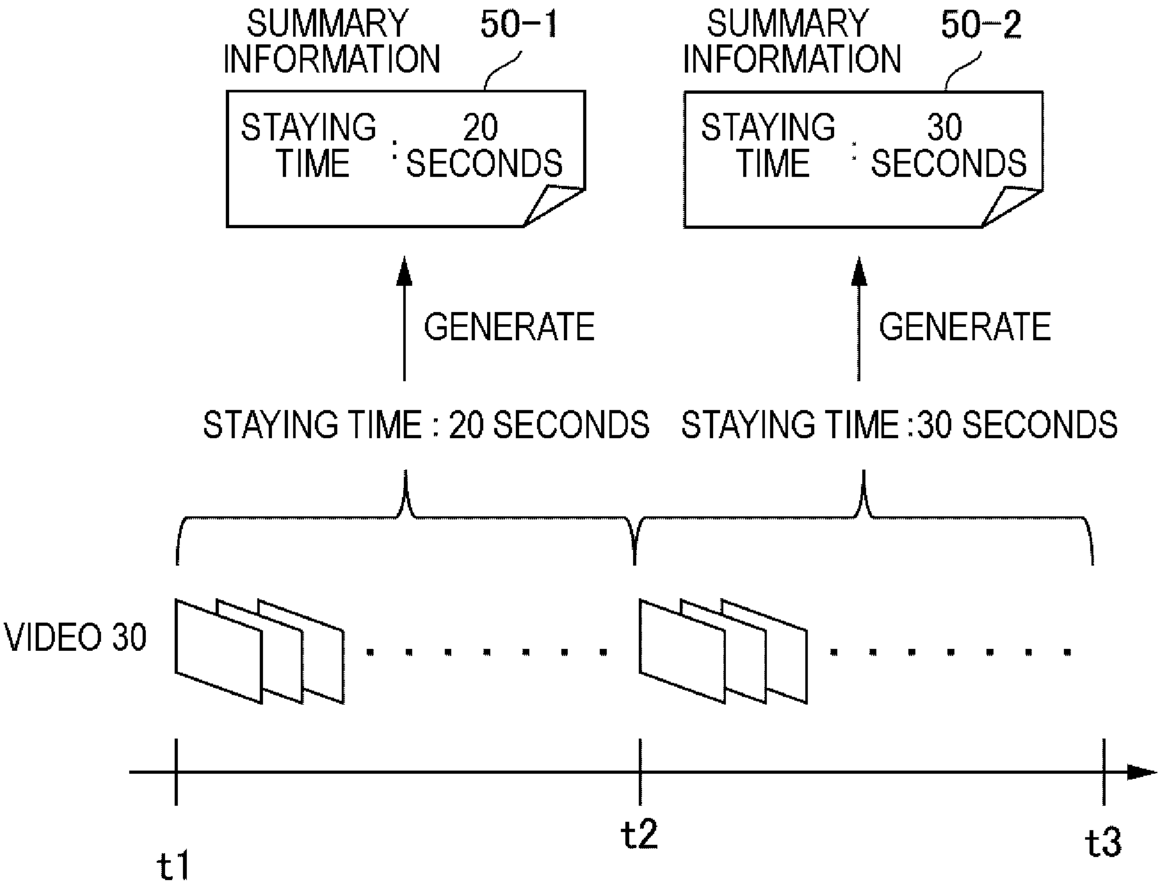
FIG. 15 is the first diagram illustrating a scene of generating the summary information.

For example, the summarizing unit 2040 repeatedly analyzes the video 30 at a predetermined cycle to individually generate summary information for a plurality of time ranges of the video 30. FIG. 15 is the first diagram illustrating a scene of generating the summary information. In this example, the summarizing unit 2040 analyzes the video 30 from the time t1 to the time t2 at the time t2, and generates the summary information 50-1 based on the result. In addition, the summarizing unit 2040 analyzes the video 30 from the time t2 to the time t3 at the time t3, and generates summary information 50-2 based on the result.

Here, the target object stays for 20 seconds from the time t1 to the time t2, and the target object stays for 30 seconds from the time t2 to the time t3. Therefore, the summarizing unit 2040 respectively generates the summary information 50-1 indicating "staying time: 20 seconds" and the summary information 50-2 indicating "staying time: 30 seconds".

Figure 16:
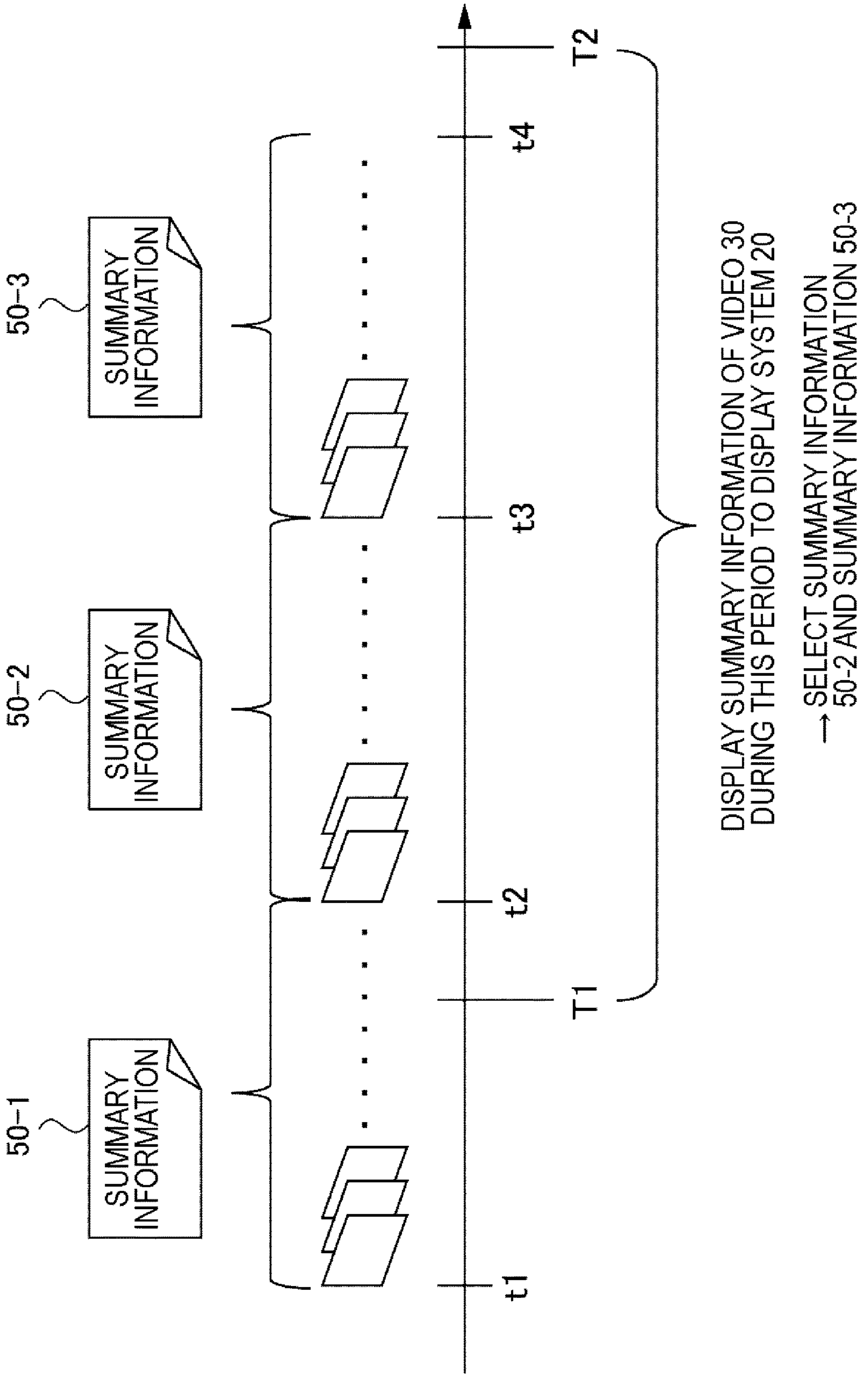
FIG. 16 is a diagram illustrating a scene in which a display control unit selects the summary information to be displayed to a display system.

Note that, the display control unit 2060 selects summary information 50 to be displayed to the display system 20 from a plurality of pieces of summary information 50 periodically generated for the video 30 as described above. FIG. 16 is a diagram illustrating a scene in which the display control unit 2060 selects the summary information 50 to be displayed to the display system 20.

In this example, the display control unit 2060 causes the display system 20 to display the summary information 50 on the video 30 between time T1 and time T2. The summary information 50 on the video 30 between the time T1 and the time T2 is the summary information 50-2 and summary information 50-3. Therefore, the display control unit 2060 causes the display system 20 to display the summary information 50-2 and the summary information 50-3.

However, a portion (time t1 to time t2) of the period from the time t1 to the time t2, which is a target period of the summary information 50-1, overlaps with the period from the time T1 to the time T2. Thus, the display control unit 2060 may cause the display system 20 to display the summary information 50-1 in addition to the summary information 50-2 and the summary information 50-3.

In a case of selecting the plurality of pieces of summary information 50 in this manner, the display control unit 2060 may cause the display system 20 to individually display the plurality of pieces of summary information 50, and perform a process (for example, statistical process) of integrating the plurality of pieces of summary information 50 into one and cause the display system 20 to display the one summary information 50 generated as a result.

Note that, generation of the summary information that is periodically performed may keep being repeatedly executed (for example, from the time when the information processing apparatus 2000 is activated) or may be started from a specified timing. For example, the specified timing is "the first time when the display state of the video 30 is switched from the first display state to the second display state" described above. More specifically, it may be "a time when a state in which the video 30 is displayed to the display system 20 is switched into a state in which the video 30 is not displayed to the display system 20", "a time when in the display system 20, a state in which the video 30 is displayed in a relatively large size is switched into a state in which the video 30 is displayed in a relatively small size", or "a time when in the display system 20, a state in which the video 30 is displayed at a position at which it is more likely to come into sight of the user is switched into a state in which the video 30 is displayed at a position at which it is less likely to come into sight of the user"

Timing 2 of Generating Summary Information

Also in this example, the summarizing unit 2040 repeatedly analyzes the video 30 at a predetermined cycle. However, the summarizing unit 2040 repeatedly updates one piece of summary information 50 based on the analysis result of the video 30.

Figure 17:
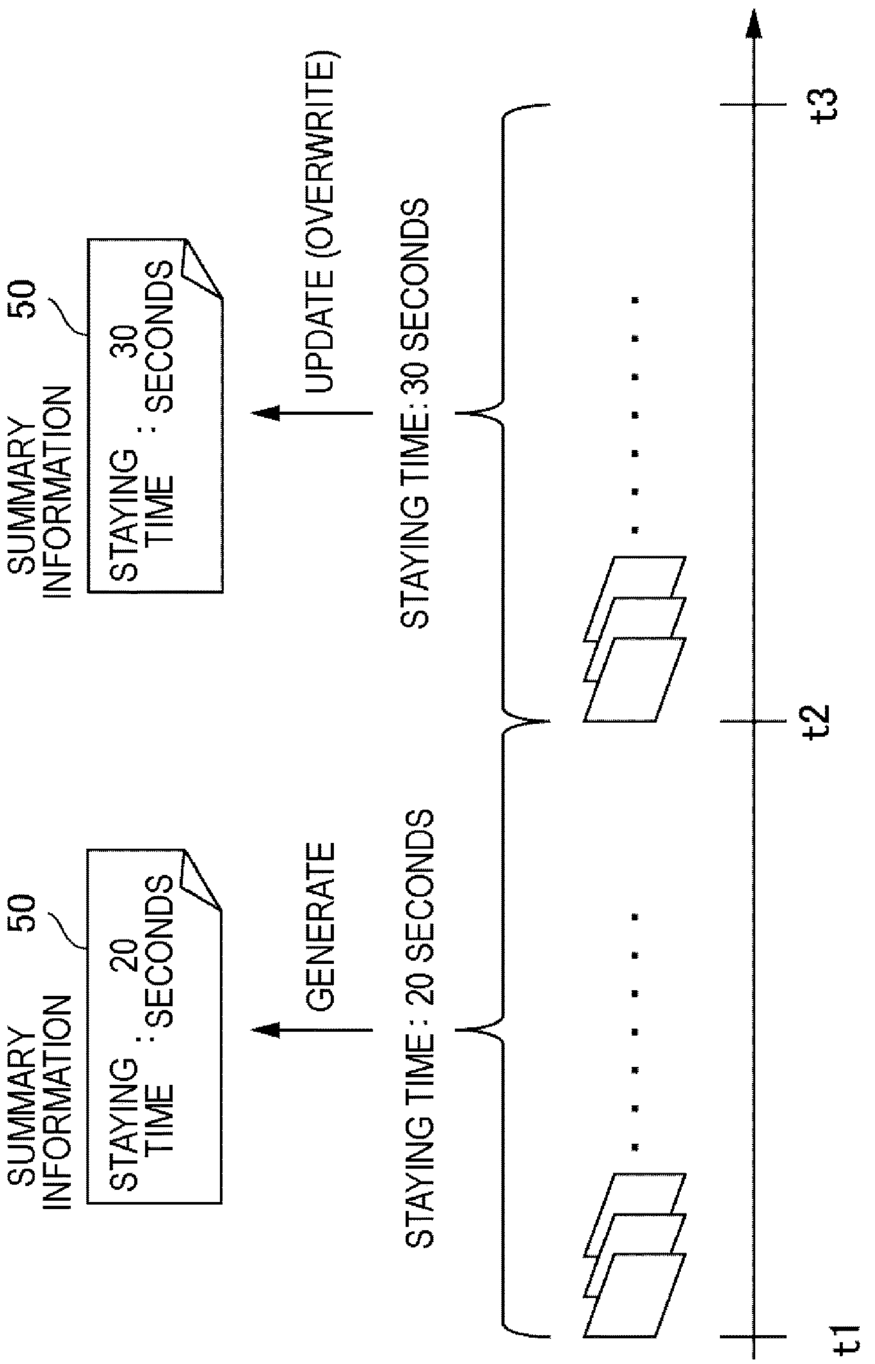
FIG. 17 is the first diagram illustrating a scene of updating the summary information.

FIG. 17 is the first diagram illustrating a scene of updating the summary information. In this example, the summarizing unit 2040 analyzes the video 30 from the time t1 to the time t2 at the time: t2, and generates the summary information 50 based on the result. After then, the summarizing unit 2040 analyzes the video 30 from the time t2 to the time t3 at the time t3, and updates the summary information 50 based on the result. It is assumed that a staying time of the target object between the time t1 and the time t2 is 20 seconds and the staying time of the target object between the time t2 and the time t3 is 30 seconds.

In FIG. 17, the summary information 50 is updated by overwriting. Thus, the summarizing unit 2040 overwrites contents of the summary information 50 indicating "staying time: 20 seconds" with information indicating "staying time: 30 seconds". In another example, the summarizing unit 2040 may perform a process of overwriting the summary information 50 with 25 seconds, which is an average value of the staying times during the two periods.

Figure 18:
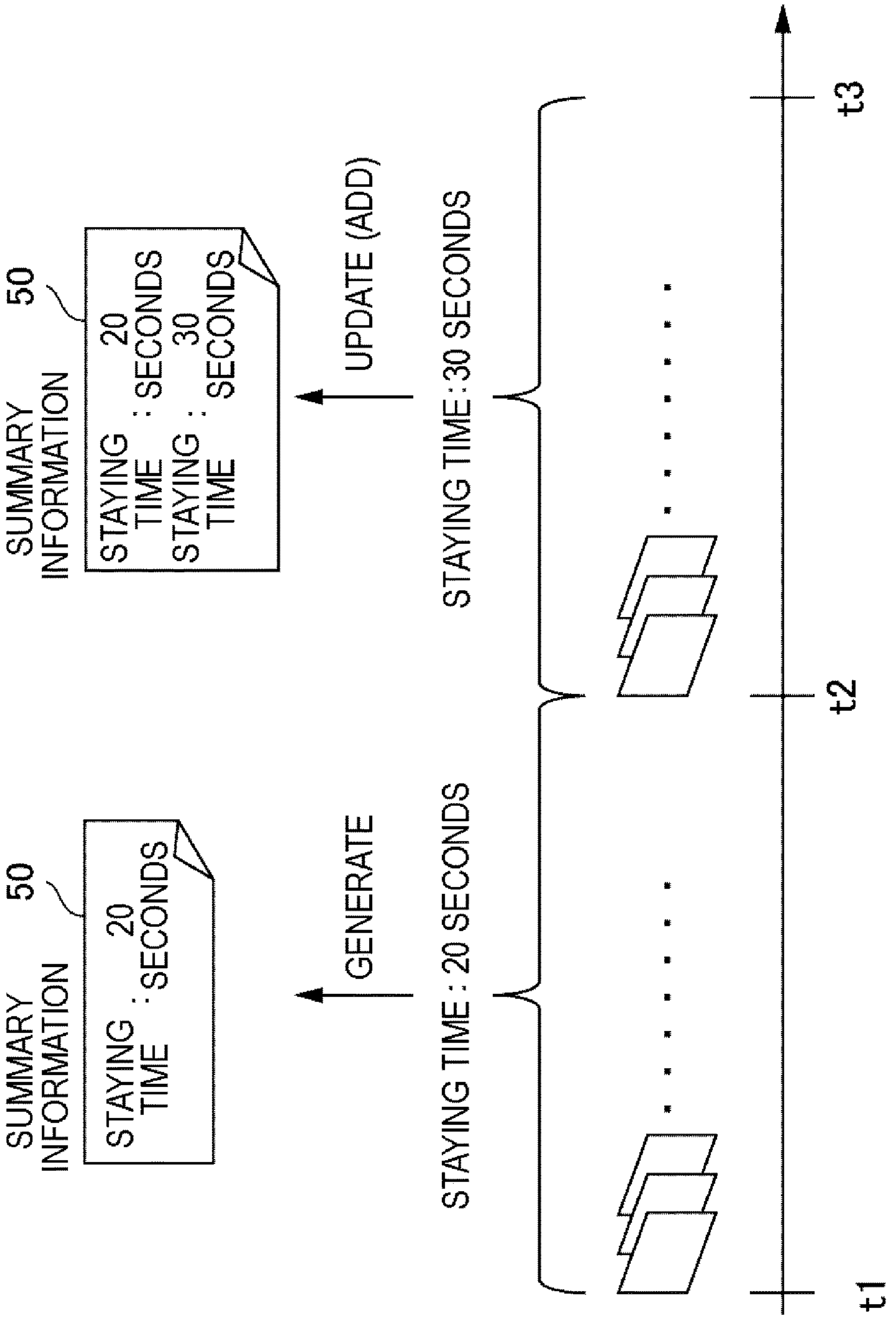
FIG. 18 is the second diagram illustrating a scene of updating the summary information.

FIG. 18 is the second diagram illustrating the scene of updating the summary information. FIG. 18 illustrates the same contents as in FIG. 17 except for the updating method.

In FIG. 18, the summary information 50 is updated by integrating a new analysis result into the previous analysis result. Thus, the summarizing unit 2040 adds information indicating "staying time: 30 seconds" to the summary information 50.

Timing 3 of Generating Summary Information

The summarizing unit 2040 may generate summary information to be displayed at timing when the predetermined condition described above (the condition for displaying the summary information of the video 30 to the display system 20) is satisfied. In this case, for example, the summarizing unit 2040 generates the summary information for the video 30 during a period between a predetermined time before the above-mentioned timing and the above-mentioned timing.

Note that, in a case where the first computer 1000 for realizing the summarizing unit 2040 is the camera 10, when the predetermined condition is satisfied, the display control unit 2060 (the second computer 1000) may transmit a request of generating summary information to the camera 10. For example, at timing when receiving the request, the summarizing unit 2040 generates the summary information for the video 30 during a period between a predetermined time before the timing and the timing. The display control unit 2060 obtains the summary information generated by the camera 10.

Example Embodiment 2

The information processing apparatus 2000 according to Example Embodiment 2 is illustrated in FIG. 1 in the same manner as the information processing apparatus 2000 of Example Embodiment 1. The information processing apparatus 2000 according to Example Embodiment 2 has the same functions as the information processing apparatus 2000 of Example Embodiment 1 except for items to be described below.

In a case of causing the display system 20 to display a plurality of pieces of summary information respectively generated from different videos 30, the display control unit 2060 according to Example Embodiment 2 causes the display system 20 to display the summary information in consideration of a priority of each of the pieces of summary information.

Figure 19:
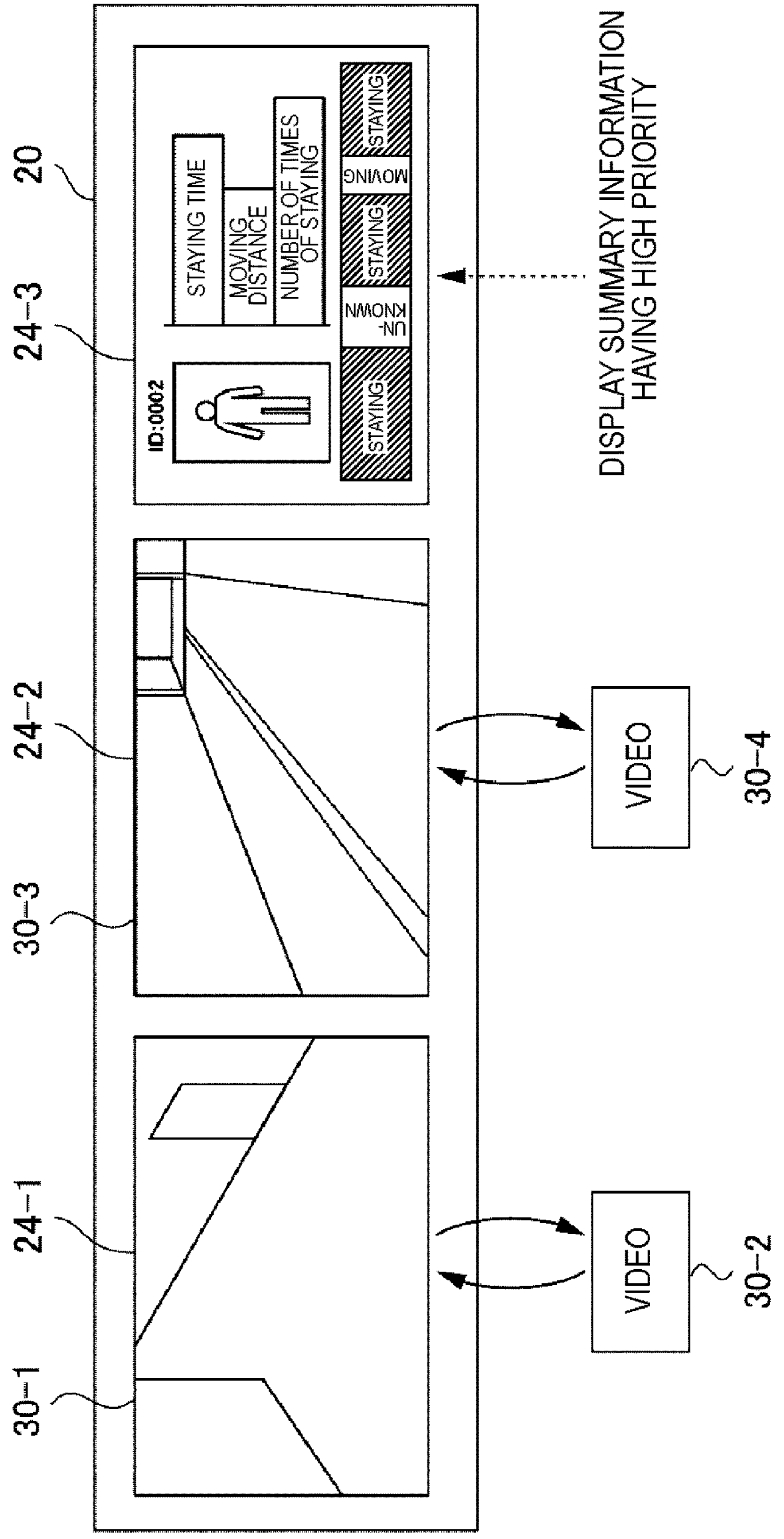
FIG. 19 is a diagram illustrating a supposed environment of an information processing apparatus according to Example Embodiment 2.

FIG. 19 is a diagram illustrating a supposed environment of the information processing apparatus 2000 according to Example Embodiment 2. In this example, the summary information of the video 30 is displayed in another display area 24 different from the display area 24 in which the video 30 is displayed. More specifically, the display system 20 includes one display device 22, and the display device 22 includes three display areas 24-1 to 24-3. The video 30-1 and the video 30-2 are alternately displayed in the display area 24-1, a video 30-3 and a video 30-4 are alternately displayed in the display area 24-2, and any one of the pieces of summary information is displayed in the display area 24-3. It is assumed that a priority of the summary information of the video 30-1 is higher than a priority of the summary information of the video 30-3.

In this case, it is assumed that both of a change in the display state of the video 30-1 and a change in the display state of the video 30-3 satisfy the predetermined condition. Here, only one of the summary information of the video 30-1 and the summary information of the video 30-3 is displayed in the display area 24-3.

Therefore, the display control unit 2060 displays the summary information of the video 30-1 having a higher priority among the summary information of the video 30-1 and the summary information of the video 30-3 in the display area 24-3. In this case, the display control unit 2060 may display only the summary information of the video 30-1 in the display area 24-3, or may display the summary information of the video 30-1 in the display area 24-3 first and then display the summary information of the video 30-3 in the display area 24-3.

Here, the process of displaying the summary information based on the priority is necessary in a case where the number of pieces of the summary information to be displayed is larger than the number of display areas to be used for displaying the summary information. Such a case is not limited to the case illustrated by using FIG. 19.

For example, it is assumed that the display system 20 has a layout illustrated in FIG. 7. It is assumed that two videos 30 are alternately displayed in each of display areas 24-1 to 24-9. On the other hand, the summary information of one of the videos 30 is displayed in the display area 24-10.

In this case, when each of changes in the display states of two or more videos 30 satisfies a predetermined condition, the number of the pieces of summary information to be displayed is equal to or larger than two. On the other hand, the number of display areas which can be used for displaying the summary information is one. Therefore, the number of the pieces of summary information to be displayed may be larger than the number of display areas 24 which can be used for displaying the summary information. Therefore, the display control unit 2060 determines the summary information to be displayed in the display area 24-10 according to the priority of the summary information to be displayed.

<Method of Determining Priority of Summary Information>

A method of determining a priority of the summary information is various. Hereinafter, an example of the method of determining the priority of the summary information will be described, <Method 1 of Determining Priority>>

A priority is set for each of the cameras 10. The priority of the camera 10 is set as a priority of summary information of the video 30 generated by the camera 10. For example, a priority of the summary information of the video 30-1 is a priority associated with the camera 10-1 which generates the video 30-1. Hereinafter, information indicating the priority of the camera 10 is referred to as priority information, FIG. 20 is a diagram illustrating the priority information in a table format. The table in FIG. 20 is referred to as a table 600. The table 600 includes a camera identifier 602 and a priority 604. The camera identifier 602 represents an identifier of the camera 10. The priority 604 indicates a priority associated with the camera 10.

The priority information (for example, the table 600) is stored in advance in a storage device accessible from the display control unit 2060. This storage device may be provided inside the information processing apparatus 2000 or may be provided outside the information processing apparatus 2000.

<Method 2 of Determining Priority of Summary Information>

A priority of summary information may be determined based on contents of the summary information. For example, the display control unit 2060 handles any numerical value indicated in the summary information as a priority of summary information. For example, in a case where the summary information indicates a staying time of the target object, the display control unit 2060 handles a value of the staying time as the priority of the summary information. In this manner, as the summary information of the video 30 has a longer staying time of the target object, the priority becomes higher. However, the numerical value handled as a priority is not limited to the staying time.

In another example, the display control unit 2060 computes a score of the summary information by using a rule (for example, a function) for computing the score of the summary information from the contents of the summary information, and handles the score as a priority of priority information. Hereinafter, an example of a rule associating a staying time with a score of summary information will be described.

Figure 21:
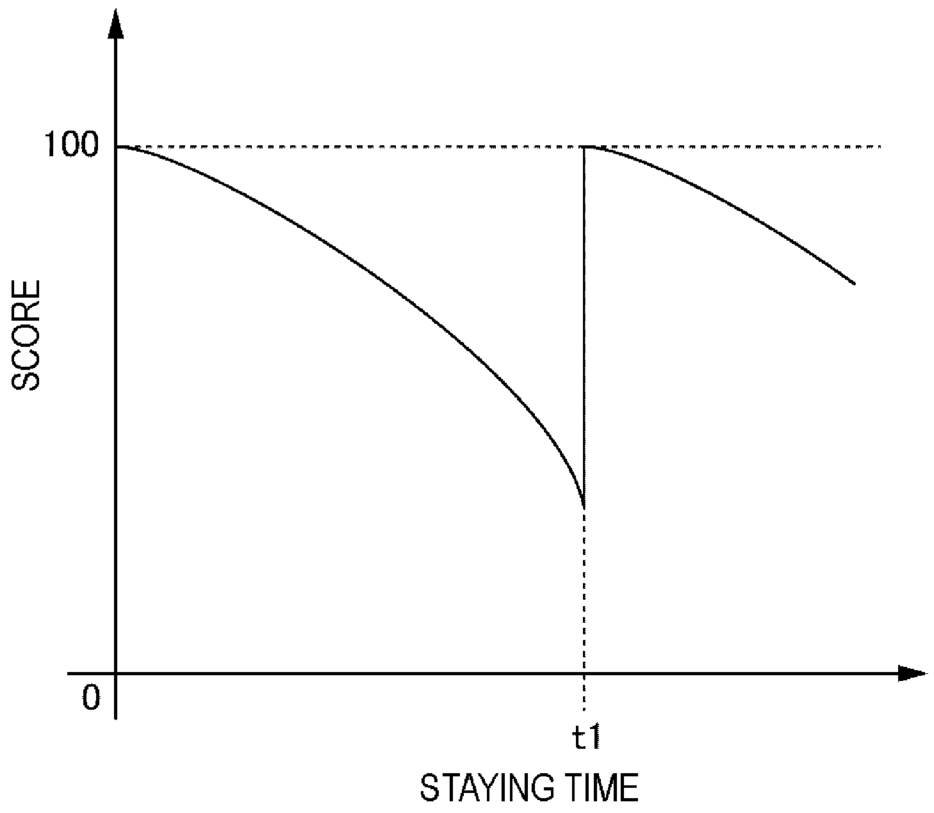
FIG. 21 is a diagram illustrating a relationship between a staying time and a priority of summary information.

FIG. 21 is a diagram illustrating a relationship between the staying time and a priority of the summary information. The horizontal axis indicates the staying time of a person captured in the video 30, and the vertical axis indicates the score of the summary information of the video 30. Here, a maximum value of the score is 100.

In this example, the score of the summary information is the maximum when the person starts staying. As the staying time becomes longer, the score of the summary information becomes smaller.

However, at timing when the staying time reaches a predetermined value t1, the score of the summary information increases. In this manner, the summary information of the person who stays for a time longer than the predetermined value is easily displayed to the display system 20.

Note that, the rule for computing the score of the summary information may include a rule for increasing the score in response to occurrence of a predetermined event. For example, the predetermined event is contact with another person.

Figure 22:
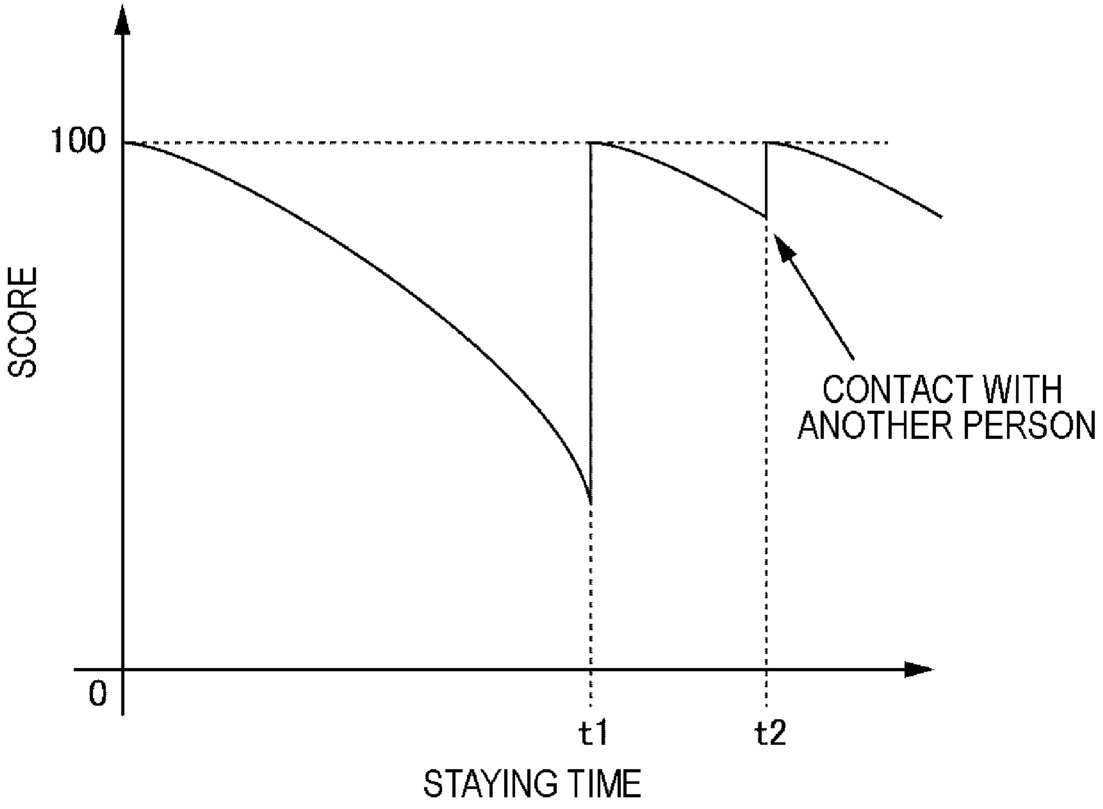
FIG. 22 is a diagram illustrating a temporal change in a score of summary information.

FIG. 22 is a diagram illustrating a temporal change in a score of summary information. The rule for computing the score of the summary information in FIG. 22 is defined by a combination of (1) a rule illustrated in FIG. 21 and (2) a rule for increasing the score according to contact with another person.

In this example, a person who stays is in contact with another person at the time t2. Thus, the score of the summary information increases at the time t2.

The priority of the summary information may be computed by using each of the scores computed from a plurality of pieces of information included in the summary information. For example, the display control unit 2060 computes the priority of the summary information by using the following Equation (1).

$$p = \sum_i w_i * f_i(d_i) \quad (1)$$

In Equation (1), p is a priority of summary information, $w_i$ is a weight given to each piece of information i (staying time and the like) included in the summary information. $d_i$ is a value of the information i included in the summary information. $f_i$ is a function for computing the score of the summary information for the information i.

Determination of Display Position Based on Priority

The display control unit 2060 may determine a display position of summary information based on a priority of the summary information. For example, a priority is associated in advance with each of the display areas 24 for displaying the summary information. The display control unit 2060 matches the summary information with the display area 24 so that the summary information having a higher priority is displayed in the display area 24 having a higher priority. Here, it is preferable that the display area 24 which the user more easily watches has a higher priority. The priority of the display area 24 is stored in advance in a storage device accessible from the display control unit 2060.

Hardware Configuration Example

The information processing apparatus 2000 according to Example Embodiment 2 is realized by using the computer 1000 in the same manner as Example Embodiment 1 (see FIG. 4). In the present example embodiment, each of the program modules stored in the storage 1080 described above further includes a program for realizing each of the function described in the present example embodiment.

Advantageous Effect

When causing the display system 20 to display the pieces of the summary information respectively generated for the different videos 30, the information processing apparatus 2000 according to the present example embodiment determines a display method of the summary information based on the priority of the summary information. In this manner, for example, it is possible to make that "the user of the information processing apparatus 2000 more easily watches the summary information having a higher priority". Therefore, it is possible to more reliably prevent important information from being overlooked. In addition, convenience of the information processing apparatus 2000 is improved for the user of the information processing apparatus 2000.

Although the example embodiments of the present invention are described with reference to the drawings, these are examples of the present invention, and a combination of the respective example embodiments or various other configurations other than the example embodiment described above may be adopted.

A part or all of the example embodiments may also be described as the following appendixes, but are not limited to the following.

1. An information processing apparatus comprising:

a summarizing unit which obtains videos and generates summary information of the obtained video by performing a summarizing process on the obtained video, each of a plurality of cameras generating the video; and a display control unit which causes a display unit to display the video, wherein, in response to that a change in a display state of the video on the display unit satisfies a predetermined condition, the display control unit causes the display unit to display the summary information of that video.

2. The information processing apparatus according to 1, wherein the display control unit causes the display unit to display summary information of a first video in response to that a display state of the first video is switched from a state not being displayed on the display unit into a state being displayed on the display unit.

3. The information processing apparatus according to 1, wherein the display control unit causes the display unit to display summary information of a first video in response to that a display state of the first video is switched from a state being displayed in a first size on the display unit into a state being displayed in a second size on the display unit, the second size being larger than the first size.

4. The information processing apparatus according to any one of 1 to 3, wherein the summarizing unit causes the display unit to display summary information of a first video generated during a period between a first time when the display state of the first video is switched from a first display state into a second display state on the display unit and a second time when the display state of the first video is switched from the second display state into the first display state on the display unit.

5. The information processing apparatus according to any one of 1 to 4, wherein in a case where a change in the display state of a first video generated by a first camera satisfies the predetermined condition and a display state of a second video generated by a second camera satisfies the predetermined condition, the display control unit causes the display unit to display the summary information having a higher priority between the summary information of the first video and the summary information of the second video.

6. The information processing apparatus according to 5, wherein the display control unit obtains a priority of summary information of each of the videos from a storage unit which stores the priority of the summary information of the video for each of the videos.

7. The information processing apparatus according to 5, wherein the display control unit computes the priority of the summary information based on contents of each piece of the summary information.

8. The information processing apparatus according to any one of 1 to 7, wherein the display control unit displays the video and the summary information generated during a past period of the video in display areas different from each other on the display unit.

9. The information processing apparatus according to any one of 1 to 7, wherein the display control unit superimposes the summary information generated during a past period of the video on the video and causes the display unit to display the superimposed video.

10. The information processing apparatus according to any one of 1 to 8, wherein the display control unit causes the display unit not to display the video while the display unit displays the summary information of the video.

11. A control method executed by a computer, the control method comprising:

a summarizing step of obtaining videos and generating summary information of the obtained video by performing a summarizing process on the obtained video, each of a plurality of cameras generating the video; and a display control step of causing a display unit to display the video, wherein in the display control step, in response to that a change in a display state of the video on the display unit satisfies a predetermined condition, the display unit displays the summary information of that video.

12. The control method according to 11, wherein in the display control step, the display unit displays summary information of a first video in response to that a display state of the first video is switched from a state not being displayed on the display unit into a state being displayed on the display unit.

13. The control method according to 11, wherein in the display control step, the display unit displays summary information of a first video in response to that a display state of the first video is switched from a state being displayed in a first size on the display unit into a state being displayed in a second size on the display unit, the second size being larger than the first size.

14. The control method according to any one of 11 to 13, wherein in the summarizing step, the display unit displays the summary information of a first video generated during a period between a first time when the display state of the first video is switched from a first display state into a second display state on the display unit and a second time when the display state of the first video is switched from the second display state into the first display state on the display unit.

15. The control method according to any one of 11 to 14, wherein in a case where a change in the display state of a first video generated by a first camera satisfies the predetermined condition and a display state of a second video generated by a second camera satisfies the predetermined condition, in the display control step, the display unit displays the summary information having a higher priority from the summary information of the first video and the summary information of the second video.

16. The control method according to 15, wherein in the display control step, a priority of summary information of each of the videos is obtained from a storage unit which stores the priority of the summary information of the video for each of the videos.

17. The control method according to 15, wherein in the display control step, the priority of the summary information is computed based on contents of each piece of the summary information.

18. The control method according to any one of 11 to 17, wherein in the display control step, the video and the summary information generated during a past period of the video are displayed in display areas different from each other on the display unit.

19. The control method according to any one of 11 to 17, wherein in the display control step, the summary information generated during a past period of the video is superimposed on the video and the display unit displays the superimposed video.

20. The control method according to any one of 11 to 18, wherein in the display control step, the display unit does not display the video while the display unit displays the summary information of the video.

21. A program causing a computer to execute each step of the control method according to any one of 11 to 20.

The invention claimed is:

1. An information processing apparatus comprising:

one or more memories storing instructions; and one or more processors configured to execute the instructions to:

a summarizing unit which obtains one or more videos and generates summary information of the obtained videos by performing a summarizing process on the obtained videos, each of a plurality of cameras generating the videos; and a display control unit which causes a display unit to display the videos, wherein, in response to a change in a display state of a first video from among the one or more videos on the display unit satisfying a predetermined condition, the display control unit causes the display unit to display the summary information of the first video, wherein the display unit includes a first size display area for displaying the one or more videos and a second size display area for displaying one of the one or more videos, the second size display area being larger than the first size display area, wherein the display control unit determines the one of the one or more videos to be displayed in the second size display area, wherein the display control unit causes the display unit to display the summary information of the first video in response to a display state of the first video being switched from a state in which the first video is displayed in the first size display area on the display unit to a state in which the first video is displayed in the second size display area on the display unit, wherein the summary information of the first video is information obtained from a content of the first video during the state in which the first video is displayed in the first size display area on the display unit, and wherein the summary information of the first video is displayed on the first video displayed in the second size display area on the display unit.

2. The information processing apparatus according to claim 1, wherein the display control unit causes the display unit to display summary information of the first video in response to a display state of the first video being switched from a state not being displayed on the display unit to a state in which the first video is displayed on the display unit.

3. The information processing apparatus according to claim 1, wherein, based on a change in the display state of the first video generated by a first camera satisfying the predetermined condition and a change in the display state of a second video from among the one or more videos generated by a second camera satisfying the predetermined condition, the display control unit causes the display unit to display the summary information having a higher priority from among the summary information of the first video and the summary information of the second video.

4. The information processing apparatus according to claim 3, wherein the display control unit obtains a priority of summary information of each of the one or more videos from a storage unit which stores the priority of the summary information of the video for each of the videos.

5. The information processing apparatus according to claim 3, wherein the display control unit computes the priority of the summary information based on contents of each piece of the summary information.

6. The information processing apparatus according to claim 1, wherein the display control unit displays the one or more videos and the summary information generated during a past period of the videos in display areas different from each other on the display unit.

7. The information processing apparatus according to claim 1, wherein the display control unit superimposes the summary information generated during a past period of the first video on the first video and causes the display unit to display the superimposed video.

8. The information processing apparatus according to claim 1, wherein the display control unit causes the display unit 5 to not display the first video while the display unit displays the summary information of the first video.

9. A control method executed by a computer, the control method comprising:

obtaining one or more videos generated by one of a plurality of cameras;

generating summary information of the obtained videos by performing a summarizing process on the obtained videos, and causing a display unit to display the videos, wherein, in response to a change in a display state of a first video from among the one or more videos on the display unit satisfying a predetermined condition, the control method further causes the display unit to display the summary information of the first video, wherein the display unit includes a first size display area for displaying the one or more videos and a second size display area for displaying one of the one or more videos, the second size display area being larger than the first size display area, wherein the control method further comprises: determining the one of the one or more videos to be displayed in the second size display area, wherein the control method further comprises: causing the display unit to display the summary information of the first video in response to a display state of the first video being switched from a state being displayed in the first size display area on the display unit to a state being displayed in the second size display area on the display unit, wherein the summary information of the first video is information obtained from a content of the first video during the state in which the first video is displayed in the first size display area on the display unit, and wherein the summary information of the first video is displayed on the first video displayed in the second size display area on the display unit.

10. The control method according to claim 9, further comprising causing the display unit to display the summary information of the first video in response to a display state of the first video being switched from a state not being displayed on the display unit to a state being displayed on the display unit.

11. The control method according to claim 9, further comprising causing, based on a change in the display state of the first video generated by a first camera satisfying the predetermined condition and a change in the display state of a second video from among the one or more videos generated by a second camera satisfying the predetermined condition, the display unit to display the summary information having a higher priority from among the summary information of the first video and the summary information of the second video.

12. The control method according to claim 11, further comprising causing a priority of summary information of each of the one or more videos to be obtained from a storage unit which stores the priority of the summary information of the video for each of the videos.

13. The control method according to claim 11, further comprising computing the priority of the summary information based on contents of each piece of the summary information.

14. The control method according to claim 9, further comprising displaying the one or more videos and the summary information generated during a past period of the videos in display areas different from each other on the display unit.

15. The control method according to claim 9, further comprising superimposing the summary information generated during a past period of the first video on the first video and the display unit displays the superimposed video.

16. The control method according to claim 9, further comprising causing the display unit to not display the first video while the display unit displays the summary information of the first video.

17. A non-transitory computer-readable storage medium storing a program causing a computer to execute each step of the control method according to claim 9.

18. An information processing apparatus comprising:

one or more memories storing instructions; and one or more processors configured to execute the instructions to:

a summarizing unit which obtains videos and generates summary information of the obtained video by performing a summarizing process on the obtained video, each of a plurality of cameras generating the video; and a display control unit which causes a display unit to display the video, wherein, in response to a change in a display state of the video on the display unit satisfying a predetermined condition, the display control unit causes the display unit to display the summary information of that video, wherein the display unit includes a first size display area for displaying the one or more videos and a second size display area for displaying one of the one or more videos, the second size display area being larger than the first size display area, wherein the display control unit determines the one of the one or more videos to be displayed in the second size display area, and wherein the summarizing unit causes the display unit to display summary information of a first video generated during a period after a first time when the display state of the first video is switched from a first display state into a second display state on the display unit and before a second time when the display state of the first video is switched from the second display state into the first display state on the display unit.

19. A control method executed by a computer, the control method comprising:

obtaining videos generated by one of a plurality of cameras;

generating summary information of the obtained videos by performing a summarizing process on the obtained video; and causing a display unit to display the video, wherein, in response to a change in a display state of the video on the display unit satisfying a predetermined condition, the control method further causes the display unit to display the summary information of that video, wherein the display unit includes a first size display area for displaying the one or more videos and a second size display area for displaying one of the one or more videos, the second size display area being larger than the first size display area, wherein the control method further comprises: determining the one of the one or more videos to be displayed in the second size display area, and wherein the control method further comprises: causing the display unit to display the summary information of a first video generated during a period after a first time when the display state of the first video is switched from a first display state into a second display state on the display unit and before a second time when the display state of the first video is switched from the second display state into the first display state on the display unit.

* * * * *